United States Patent
Damnjanovic et al.

(10) Patent No.: US 10,182,456 B2
(45) Date of Patent: Jan. 15, 2019

(54) COLLISION DETECTION IN A SHARED RADIO FREQUENCY SPECTRUM BAND

(71) Applicant: QUALCOMM Incorporated, San Diego, CA (US)

(72) Inventors: Aleksandar Damnjanovic, Del Mar, CA (US); Maarten Menzo Wentink, Naarden (NL); Srinivas Yerramalli, San Diego, CA (US); Qingsi Wang, San Diego, CA (US); Yongbin Wei, La Jolla, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/246,005

(22) Filed: Aug. 24, 2016

(65) Prior Publication Data

US 2017/0111931 A1    Apr. 20, 2017

Related U.S. Application Data

(60) Provisional application No. 62/242,299, filed on Oct. 15, 2015, provisional application No. 62/242,909, (Continued)

(51) Int. Cl.
*H04W 74/08* (2009.01)
*H04W 16/14* (2009.01)
(Continued)

(52) U.S. Cl.
CPC ....... *H04W 74/0825* (2013.01); *H04W 16/14* (2013.01); *H04W 74/0858* (2013.01);
(Continued)

(58) Field of Classification Search
CPC ............. H04W 16/14; H04W 74/0825; H04W 74/0858
See application file for complete search history.

(56) References Cited

U.S. PATENT DOCUMENTS

| 2012/0069766 A1 | 3/2012 | Fu et al. | |
|---|---|---|---|
| 2013/0170435 A1* | 7/2013 | Dinan | H04L 45/50 370/328 |

(Continued)

FOREIGN PATENT DOCUMENTS

| EP | 2833690 A1 | 2/2015 |
|---|---|---|
| WO | WO-2010083606 A1 | 7/2010 |
| WO | WO-2013085256 A1 | 6/2013 |

OTHER PUBLICATIONS

ISA/EP, International Search Report and Written Opinion of the International Searching Authority, Int'l Application No. PCT/US2016/048555, dated Feb. 7, 2017, European Patent Office, Rijswijk, NL, 19 pgs.

(Continued)

*Primary Examiner* — Wei Zhao
(74) *Attorney, Agent, or Firm* — Nerrie M. Zohn

(57) ABSTRACT

Detection and reporting techniques for collisions between transmitters of two different radio access technologies (RATs) transmitting in a shared radio frequency spectrum band is described. The collision may occur following a listen-before-talk procedure but prior to transmission of data, and may not affect the reception of the transmitted data. Collisions may be detected using for example, energy sensing, preamble or ready-to-send (RTS) signal detection, or unsuccessful decoding of all or part of a channel reservation signal. A transmitting device may determine a collision has occurred by detecting an energy level during a preamble transmission is greater than a threshold level or by detecting that an energy level during a transmission gap of a time- (Continued)

domain energy pattern is above a threshold level. A receiving device, such as a user equipment (UE), that detects the collision may report the collision to the transmitter.

28 Claims, 14 Drawing Sheets

Related U.S. Application Data filed on Oct. 16, 2015, provisional application No. 62/251,573, filed on Nov. 5, 2015.

(51) Int. Cl.
*H04W 84/12* (2009.01)
*H04L 5/00* (2006.01)
*H04W 88/06* (2009.01)

(52) U.S. Cl.
CPC ........... *H04L 5/0055* (2013.01); *H04W 84/12* (2013.01); *H04W 88/06* (2013.01)

(56) References Cited

U.S. PATENT DOCUMENTS

2016/0338053 A1\* 11/2016 Park ................. H04W 74/0808
2017/0215157 A1\* 7/2017 Yang .................. H04W 52/367

OTHER PUBLICATIONS

ISA/EPO, Partial International Search Report of the International Searching Authority, Int'l. App. No. PCT/US2016/048555, dated Nov. 16, 2016, European Patent Office, Rijswijk, NL, 7 pgs.

Woesner et al., "IEEE 802.11—Wireless Access Methods and Physical Layer Specifications—Modified Backoff Algorithms for DCF—Proposed Update to Section 5.2.5." IEEE, Jul. 14, 1995, 8 pgs, doc: IEEE P802.11-95/183, XP068085521, Institute of Electrical and Electronics Engineers, Berlin, Germany.

\* cited by examiner

COLLISION DETECTION IN A SHARED RADIO FREQUENCY SPECTRUM BAND

CROSS REFERENCES

The present application for patent claims priority to U.S. Provisional Patent Application No. 62/242,299 by Damnjanovic, et al., entitled "COLLISION FEEDBACK IN A SHARED RADIO FREQUENCY SPECTRUM BAND," filed Oct. 15, 2015, U.S. Provisional Patent Application No. 62/242,909 by Damnjanovic, et al., entitled "COLLISION FEEDBACK IN A SHARED RADIO FREQUENCY SPECTRUM BAND", filed Oct. 16, 2015, and U.S. Provisional Patent Application No. 62/251,573 by Damnjanovic, et al., entitled "COLLISION FEEDBACK IN A SHARED RADIO FREQUENCY SPECTRUM BAND," filed Nov. 5, 2015 and assigned to the assignee hereof. Each of these Applications are expressly incorporated by reference herein for any and all purposes.

BACKGROUND

Field of the Disclosure

The present disclosure relates to wireless communication systems, and more particularly to techniques for collision detection and management in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may operate according to a first radio access technology (RAT), such as LTE, and may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station). A second wireless multiple-access communications system may operate according to a second RAT, such as Wi-Fi, and may include a number of base stations or access points (APs), each simultaneously supporting communication for multiple mobile devices or stations (STAs). APs may communicate with STAs on downstream and upstream links. In some cases both types of communication systems may operate in the presence of one another and may use shared resources.

In a wireless local area network (WLAN), such as Wi-Fi, an AP may communicate with multiple STAs over a shared radio frequency spectrum. The STAs may use contention procedures that include communicating one or more control frames prior to establishing a communication link, such that confirmation of the communication link via exchange of control frames limits interference experienced by nearby communication devices. One example of such techniques include Request to Send (RTS) and Clear to Send (CTS) messaging, where, for example, a STA looking to communicate with another device (e.g., another STA or AP), may first send an RTS frame to the device. Once the recipient device receives the RTS frame, the recipient device may confirm the communication link by sending a CTS frame. After the CTS frame is received by the STA, the STA may then begin transmitting data to the recipient device. In this way, RTS/CTS messaging can reduce frame collisions by enabling a device, such as a STA or AP, to in essence clear the communication path before transmitting data to an AP or STA.

In an LTE network, a base station and a UE may communicate over a dedicated frequency spectrum or over different frequency bands of the radio frequency spectrum (e.g., a dedicated radio frequency band and a shared radio frequency band) of a cellular network. With increasing data traffic in cellular networks that use dedicated (e.g., licensed) radio frequency bands, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable. An LTE device that utilizes both dedicated and shared frequency spectrum may be considered to be an LTE-Unlicensed (LTE-U) device.

Prior to gaining access to and communicating over a shared radio frequency spectrum, a base station or UE may perform a listen before talk (LBT) procedure to contend for access to the shared radio frequency spectrum. This LBT procedure may be compatible with contention procedures used by Wi-Fi devices to gain access to the shared radio frequency spectrum. An LBT procedure may include performing a clear channel assessment (CCA) procedure to determine whether a channel of the shared radio frequency spectrum is available. When it is determined that the channel of the shared radio frequency spectrum is available, a channel usage beacon signal (CUBS) may be transmitted to reserve the channel. A different UE or base station may receive and decode the CUBS to identify that the channel has been reserved, while a STA or AP may monitor the shared channel (e.g., using energy detection) to determine whether the channel is busy. After identifying the CUBS, other base stations or UEs may utilize resources on the shared channel that are not being used by the transmitting UE. After determining the detected energy is above a threshold, Wi-Fi devices may refrain from transmitting on the channel for a period of time. The use of LTE and Wi-Fi devices in relatively close proximity to one another may result in one RAT impacting channel access opportunities for transmitting devices using another RAT. Thus, it may be desirable to develop techniques to help provide fairness in channel access opportunities for transmitters accessing a shared radio frequency spectrum using different RATs.

SUMMARY

Systems, methods, and apparatuses for collision detection and management in a shared radio frequency spectrum band are described. A device may detect a collision between transmitters of two different radio access technologies (RATs) transmitting in a shared radio frequency spectrum band. The collision may occur during an initial portion (e.g., preamble) of a transmission from a first transmitter that transmits on a first RAT and may be undetected by the first transmitter (e.g., because a data portion of the transmission received by a receiving device may be unaffected, etc.). In some examples, the receiving device, such as a user equipment (UE), may be configured to detect the collision and may report the collision to the first transmitter. The first transmitter may then adjust a contention window (CW) based at least in part on CW adjustment techniques, such as by increasing a backoff time associated with the CW. Collisions may be detected using a number of different techniques such as, for example, through energy sensing, through preamble or ready-to-send (RTS) signal detection of a particular RAT, or through unsuccessful decoding of all or part of a channel reservation signal transmitted by the first transmitter prior to data transmissions by the first transmitter. In some cases, a transmitting device may determine a collision has occurred by detecting an energy level during a preamble transmission is greater than a threshold level or by detecting that an energy level during a transmission gap of a time-domain energy pattern is above a threshold level.

A method of wireless communication at a user equipment is described. The method may include detecting a signal in a shared radio frequency spectrum band, the signal including a first communication transmitted using a first radio access technology and a second communication transmitted using a second radio access technology, the second communication overlapping at least a portion of the first communication, determining a collision of the first communication and the second communication based at least in part on detecting; and reporting the collision to a node of a wireless communications network associated with the user equipment.

An apparatus for wireless communication at a user equipment is described. The apparatus may include means for detecting a signal in a shared radio frequency spectrum band, the signal including a first communication transmitted using a first radio access technology and a second communication transmitted using a second radio access technology, the second communication overlapping at least a portion of the first communication, means for determining a collision of the first communication and the second communication based at least in part on detecting; and means for reporting the collision to a node of a wireless communications network associated with the user equipment.

A further apparatus for wireless communication at a user equipment is described. The apparatus may include a processor, memory in electronic communication with the processor, and instructions stored in the memory and operable, when executed by the processor, to cause the apparatus to detect a signal in a shared radio frequency spectrum band, the signal including a first communication transmitted using a first radio access technology and a second communication transmitted using a second radio access technology, the second communication overlapping at least a portion of the first communication, determine a collision of the first communication and the second communication based at least in part on detecting; and report the collision to a node of a wireless communications network associated with the user equipment.

A non-transitory computer-readable medium storing code for wireless communication at a user equipment is described. The code may include instructions executable to detect a signal in a shared radio frequency spectrum band, the signal including a first communication transmitted using a first radio access technology and a second communication transmitted using a second radio access technology, the second communication overlapping at least a portion of the first communication, determine a collision of the first communication and the second communication based at least in part on detecting; and report the collision to a node of a wireless communications network associated with the user equipment.

In some examples of the method, apparatuses, or non-transitory computer-readable medium described herein the first communication comprises a channel reservation signal transmitted by a first transmitter using the first radio access technology. In certain examples, the collision may occur at the beginning of a transmission opportunity (TxOP), and collide over a portion of the channel reservation signal. Additionally or alternatively, the channel reservation signal may include one or more of a channel usage beacon signal (CUBS) or a fractional CUBS transmitted by the first transmitter.

In some examples of the method, apparatuses, or non-transitory computer-readable medium described herein the second communication may include a request to send (RTS) transmission transmitted by a second transmitter using the second radio access technology. In certain examples, the determining the collision may include identifying a difference in an energy level of the signal for a first portion of a transmission time period that exceeds an energy level of the first communication. Additionally or alternatively, the determining the collision may include identifying that a duration of the difference in the energy level corresponds to transmission duration used of an RTS transmission associated with the second RAT.

In some examples of the method, apparatuses, or non-transitory computer-readable medium described herein the reporting the collision may include transmitting an indication on one or more of a physical uplink shared channel (PUSCH) or a physical uplink control channel (PUCCH) to the node of the wireless communications network associated with the user equipment.

In some examples of the method, apparatuses, or non-transitory computer-readable medium described herein the first communication may include a data portion, and the method, apparatuses, or non-transitory computer-readable medium may include identifying that the collision occurred between the first communication and the second communication prior to the data portion of the first communication being transmitted.

In some examples of the method, apparatuses, or non-transitory computer-readable medium described herein identifying the collision may include attempting to decode a second signal transmitted by a first transmitter prior to the data portion of the communication, and identifying the collision based at least in part on unsuccessfully decoding at least a portion of the second signal. In some examples, the second signal transmitted by the first transmitter prior to the data portion of the first communication comprises a first radio access technology preamble, and wherein successful decoding of the first radio access technology preamble indicates a collision-free transmission. In certain examples, the first radio access technology preamble may include a waveform generated from a time-domain sequence. In certain examples, the second signal transmitted by the first transmitter prior to the data portion of the first communication includes a code sequence having a transmission duration that is greater than or equal to a RTS duration of an RTS signal of the second radio access technology and extends to a signal transmission boundary associated with the first radio access technology, and the identifying the collision is based at least in part on unsuccessfully decoding of at least a portion of the code sequence.

In some examples of the method, apparatuses, or non-transitory computer-readable medium described herein includes receiving a second signal transmitted by the first transmitter prior to the data portion of the first communication, and identifying that the collision occurred based at least in part on an energy level detected during the second signal. In some examples, the received second signal comprises a time-domain energy signature that includes a first high energy period and a subsequent first low energy period, and identifying that the collision occurred is based at least in part on identifying that an energy level detected during the first low energy period is greater than a threshold. In some examples, the received second signal comprises a second high energy period, following the first low energy period, that extends to a signal transmission boundary associated with the first radio access technology. In other examples, the received second signal comprises a second low energy period, following the first low energy period, and identifying that a second collision occurred prior to the data portion of the first communication between the first transmitter and a third transmitter that transmits over the shared radio frequency spectrum band using the first radio access technology based at least in part on an energy level detected during the second low energy period.

Another method of wireless communication at a base station is described. The method may include transmitting a first communication to a user equipment over a shared radio frequency spectrum band using a first radio access technology, wherein the first communication comprises a time-domain energy signature that includes a first high energy period and a subsequent first low energy period, identifying that a collision occurred between the first communication and a second communication from a second transmitter using a second radio access technology based at least in part on an energy level detected during the time-domain energy signature, and increasing a contention window for a subsequent communication transmitted over the shared radio frequency spectrum band based at least in part on the identifying.

Another apparatus for wireless communication at a base station is described. The apparatus may include means for transmitting a first communication to a user equipment over a shared radio frequency spectrum band using a first radio access technology, wherein the first communication comprises a time-domain energy signature that includes a first high energy period and a subsequent first low energy period, means for identifying that a collision occurred between the first communication and a second communication from a second transmitter using a second radio access technology based at least in part on an energy level detected during the time-domain energy signature, and means for increasing a contention window for a subsequent communication transmitted over the shared radio frequency spectrum band based at least in part on the identifying.

A further apparatus for wireless communication at a base station is described. The apparatus may include a processor, memory in electronic communication with the processor, and instructions stored in the memory and operable, when executed by the processor, to cause the apparatus to transmit a first communication to a user equipment over a shared radio frequency spectrum band using a first radio access technology, wherein the first communication comprises a time-domain energy signature that includes a first high energy period and a subsequent first low energy period, identifying that a collision occurred between the first communication and a second communication from a second transmitter using a second radio access technology based at least in part on an energy level detected during the time-domain energy signature, and increase a contention window for a subsequent communication transmitted over the shared radio frequency spectrum band based at least in part on the identifying.

A non-transitory computer-readable medium storing code for wireless communication at a base station is described. The code may include instructions executable to transmit a first communication to a user equipment over a shared radio frequency spectrum band using a first radio access technology, wherein the first communication comprises a time-domain energy signature that includes a first high energy period and a subsequent first low energy period, identify that a collision occurred between the first communication and a second communication from a second transmitter using a second radio access technology based at least in part on an energy level detected during the time-domain energy signature, and increase a contention window for a subsequent communication transmitted over the shared radio frequency spectrum band based at least in part on the identifying.

Some examples of the method, apparatuses, or non-transitory computer-readable medium described herein may further include processes, features, means, or instructions for transmitting a third communication to the user equipment over the shared radio frequency spectrum band using the first radio access technology; receiving an acknowledgement that the third communication has been successfully received by the user equipment; and resetting the contention window to a predetermined value based at least in part on the acknowledgement being received without a second indication that a collision occurred.

In some examples of the method, apparatuses, or non-transitory computer-readable medium described herein increasing the contention window comprises linearly increasing or exponentially increasing the contention window. Additionally or alternatively, some examples may include processes, features, means, or instructions for observing a maximum time period of the contention window for the subsequent communication.

In some examples of the method, apparatuses, or non-transitory computer-readable medium described herein, the first communication comprises a code sequence having a transmission duration that is greater than or equal to a request to send (RTS) duration of an RTS signal of the second radio access technology and extends to a signal transmission boundary associated with the first radio access technology. Additionally or alternatively, some examples may include processes, features, means, or instructions for receiving an acknowledgement that a data portion of the first communication was successfully decoded by the user equipment. In certain examples, the first communication further includes a second high energy period, following the first low energy period, that extends to a signal transmission boundary associated with the first radio access technology. In some examples, the first communication further comprises a second low energy period, following the first low energy period, wherein an interval for the second low energy period is randomly selected. In some examples of the method, apparatuses, or non-transitory computer-readable medium described herein, identifying that the collision occurred is based at least in part on identifying that an energy level detected during the first low energy period is greater than a threshold. In some examples of the method, apparatuses, or non-transitory computer-readable medium described herein, identifying that the collision occurred includes receiving, from a UE, an indication that the collision occurred based at least in part on the energy level being detected by the UE during the time-domain energy signature.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
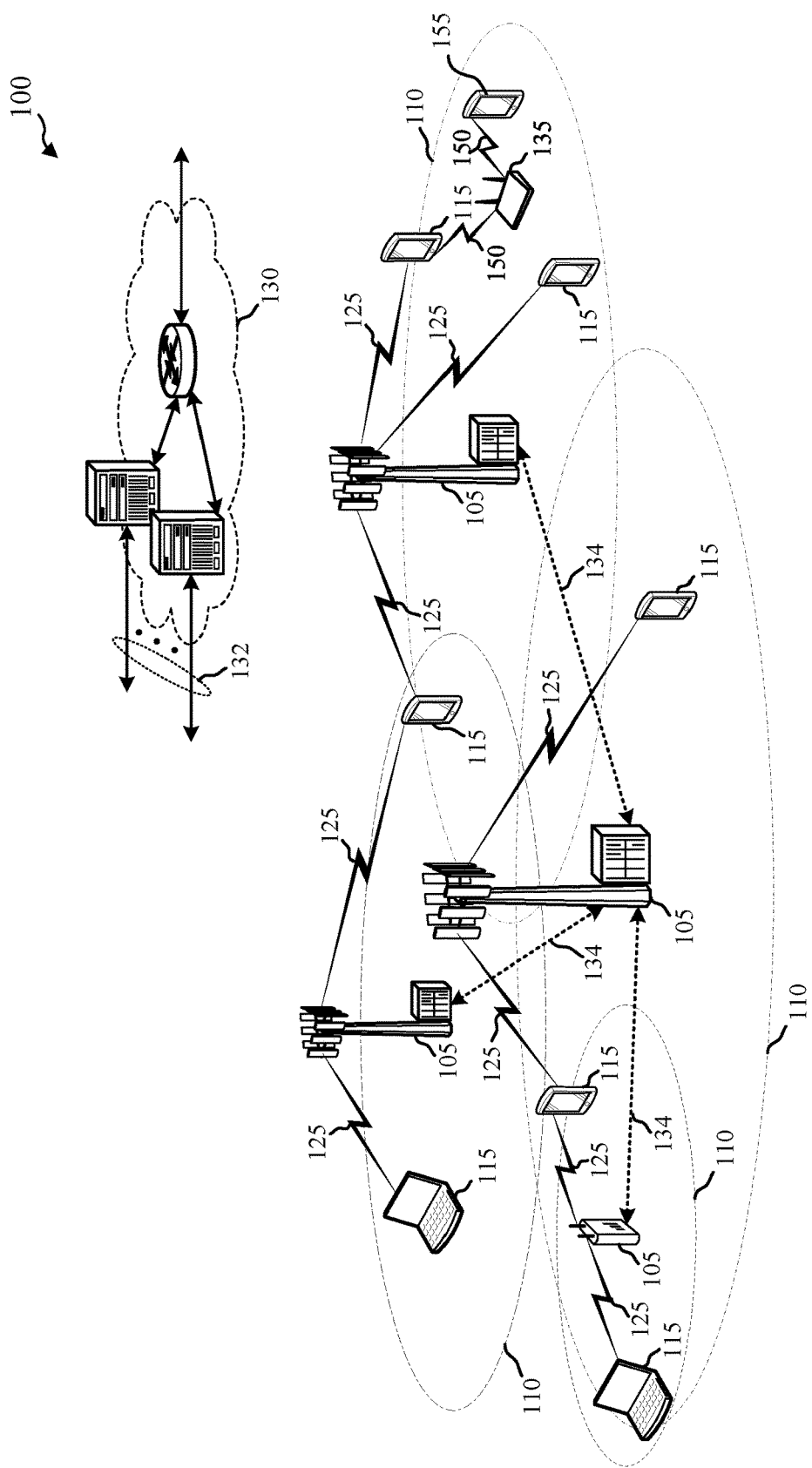
FIG. 1 illustrates an example of a wireless communications system that supports collision reporting for multiple radio access technology (RAT) co-existence in accordance with various aspects of the present disclosure.

The described features generally relate to improved systems, methods, or apparatuses for collision reporting for multiple radio access technology (RAT) co-existence. Various aspects of the disclosure provide a device, such as a user equipment (UE) that may detect a collision between transmitters of two different RATs transmitting in a shared radio frequency spectrum band. The device may report the collision to a transmitting node of a wireless communications network of a first RAT, and the transmitting node may adjust contention-based access techniques for accessing the shared radio frequency spectrum band based at least in part on receiving the report of the collision. Such techniques may provide enhanced access fairness to transmitters that operate according to different RATs.

For example, a long term evolution (LTE) system may transmit LTE-based signals using the shared radio frequency spectrum band, and may perform a listen-before-talk (LBT) procedure (e.g., a clear channel assessment (CCA) procedure) to determine, prior to transmitting, that no active transmitters are using a channel of the shared radio frequency spectrum band. If the LBT procedure passes, the LTE transmitter may begin transmitting a channel reservation signal, such as a channel usage beacon signal (CUBS), and then move directly into transmitting data using the channel. However, a Wi-Fi transmitter may have also performed a LBT procedure, and may transmit a ready-to-send (RTS) signal that overlaps with the transmission of the channel reservation signal transmitted by the LTE transmitter. In such a situation, the receiving Wi-Fi node may not receive the RTS signal, and thus may not reply with a clear-to-send (CTS) signal. The transmitting Wi-Fi node will thus treat this as a collision, and may perform a backoff procedure to increase a contention window size that determines an amount of time the Wi-Fi node waits until attempting channel access again.

The LTE transmitter, however, in such a case may not wait for any type of CTS signal and simply continue to transmit the data transmissions as mentioned above. Furthermore, the LTE transmitter may be unaware that the Wi-Fi transmitter had a colliding transmission. As a result, the Wi-Fi transmitter increases its CW size, while the LTE transmitter may set its CW size to an initial CW size that is substantially reduced from the increased CW size of the Wi-Fi transmitter. Such a scenario thus results in the LTE node having enhanced access opportunities to the shared radio frequency spectrum band and may result in unfair wireless channel access between the two RATs.

Various aspects of the present disclosure provide techniques for detecting and/or reporting the collision so a transmitting node can adjust its CW in a manner to provide enhanced fairness in channel access. In some examples, a receiving device, such as a user equipment (UE), may detect a collision between transmissions of transmitters of two different RATs. The device that detects the collision may report the collision to a first transmitter of a first RAT. The first transmitter may then adjust its CW based at least in part on established CW adjustment techniques, such as by increasing a backoff time associated with the CW. Collisions may be detected using a number of different techniques such as, for example, through energy sensing, through preamble or RTS signal detection of a particular RAT, or through unsuccessful decoding of all or part of a channel reservation signal transmitted by the first transmitter prior to data transmissions by the first transmitter.

As mentioned, such collision reporting techniques may provide for enhanced co-existence of different RATs using a shared radio frequency band. With increasing data traffic in cellular networks that use a licensed radio frequency band, offloading of at least some data traffic to an unlicensed radio frequency band (e.g., unlicensed frequency bands used by devices operating according to various wireless local area network (WLAN) protocols, which may be called "Wi-Fi" technologies) may provide a cellular operator (e.g., an operator employing a coordinated set of base stations defining a cellular network, such as an LTE/LTE-A network) with opportunities for enhanced data transmission capacity. For example, the unlicensed spectrum may be used to alleviate heavy traffic in the licensed domain or to increase throughput using carrier aggregation, for example. Using LTE technology in the unlicensed frequency band (which may be called LTE-U, in some examples) may provide significant performance gain over Wi-Fi technologies. For instance, LTE technologies utilize a more spectrally efficient PHY layer design. In addition LTE uses a more efficient multiple access scheme that allows multiple devices to access the medium at one time. Wi-Fi, on the other hand, may operate in a time division multiplexing (TDM) manner in which devices avoid transmitting at the same time. Thus techniques such as disclosed herein may provide for enhanced efficiency for shared resources between the different technologies.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include a cellular network and a Wi-Fi network. The cellular network may include one or more base stations 105, one or more UEs 115, and a core network 130. The Wi-Fi network may include one or more Wi-Fi access points 135, and one or more Wi-Fi stations 155.

With reference to the cellular network of the wireless communication system 100, the core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The cellular network may include base stations 105 of different types (e.g., macro and/or small cell base stations). There may be geographic coverage areas 110 that overlap for different technologies.

In some examples, the cellular network may include an LTE/LTE-A network. In LTE/LTE-A networks, the term evolved Node B (eNB) may be used to describe the base stations 105, while the term UE may be used to describe the UEs 115. The cellular network may be a Heterogeneous LTE/LTE-A network in which different types of eNBs provide coverage for various geographical regions. For example, each eNB or base station 105 may provide communication coverage for a macro cell, a small cell, and/or other type of cell. The term "cell" can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell, that may operate in the same or different (e.g., licensed, unlicensed, etc.) RF spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may, in some examples, include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105 and network equipment, including macro eNBs, small cell eNBs, relay base stations, and the like.

The communication links 125 shown in wireless communication system 100 may carry downlink (DL) transmissions from a base station 105 to a UE 115, and/or uplink (UL) transmissions from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time-domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

With reference to the Wi-Fi network of the wireless communication system 100, the Wi-Fi access points 135 may wirelessly communicate with the Wi-Fi stations 155 via one or more Wi-Fi access point antennas, over one or more communication links 150. In some examples, the Wi-Fi access points 135 may communicate with the Wi-Fi stations 155 using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac). In some examples, transmissions over communication links 150 from Wi-Fi access points 135 may be received by a LTE UE 115.

In some examples, a Wi-Fi station 155 may be a cellular phone, a personal digital assistant (PDA), a wireless communication device, a handheld device, a tablet computer, a laptop computer, or the like. In some examples, an apparatus may include aspects of both a UE 115 and a Wi-Fi station 155, and such an apparatus may communicate with one or more base stations 105 using a first radio access technology (RAT) (e.g., a cellular RAT, or multiple cellular RATs), and communicate with one or more Wi-Fi access points 135 using a second RAT (e.g., a Wi-Fi RAT, or multiple Wi-Fi RATs).

In some examples, the base stations 105 and UEs 115 may communicate over a licensed RF spectrum band and/or a shared RF spectrum band, whereas the Wi-Fi access points 135 and Wi-Fi stations 155 may communicate over the shared RF spectrum band. The shared RF spectrum band may therefore be shared by the base stations 105, the UEs 115, the Wi-Fi access points 135, and/or the Wi-Fi stations 155. Because the shared RF spectrum band may be shared by apparatuses operating under different protocols (e.g., different RATs) without centralized resource allocation, transmitting apparatuses may contend for access to the shared RF spectrum band, as discussed above.

In some examples, the shared RF spectrum band may include one or more unlicensed RF spectrum bands that are open for shared use by any device that complies with regulatory agency rules (e.g., associated with a country) for communicating via the one or more unlicensed RF spectrum bands. For example, unlicensed RF spectrum bands include various radio frequencies between approximately 5 GHz and approximately 6 GHz. As a more specific example, unlicensed RF spectrum bands may include one or more radio frequencies between approximately 5.15 GHz and approximately 5.825 GHz.

As another example, the shared RF spectrum band may include one or more RF spectrum bands defined by the United States Federal Communications Commission (FCC) as the Unlicensed National Information Infrastructure (U-NII) radio band. The U-NII radio band may include, for example, a first RF spectrum band between approximately 5.15 GHz and approximately 5.25 GHz (e.g., the U-NII Low band), a second RF spectrum band between approximately 5.25 GHz and approximately 5.35 GHz (e.g., the U-NII Mid band), a third RF spectrum band between approximately 5.47 GHz and approximately 5.725 GHz (e.g., the U-NII Worldwide band), and/or a fourth RF spectrum band between approximately 5.725 GHz and approximately 5.825 GHz (e.g., the U-NII Upper band).

In some examples, the shared RF spectrum band may include one or more RF spectrum bands that are licensed to multiple operators, or licensed to a primary user, with opportunistic access by other users. As used herein, "shared RF spectrum" refers to unlicensed spectrum, multiple-operator spectrum, or spectrum that has a primary user or operator, but allows opportunistic access by other users.

The shared RF spectrum band may be divided into RF channels via which RF communications may be transmitted. For example, the shared RF spectrum band may include one or more channels of approximately 20 MHz bandwidth.

Wireless devices (e.g., UE 115, Wi-Fi access point 135, base station 105, etc.) may communicate via an RF channel included in the shared RF spectrum band. For example, a wireless device may communicate via an RF channel using a Wi-Fi radio access technology, an LTE radio access technology, or the like. In some aspects, a wireless device may report collisions of transmissions of the different RATs to transmitting nodes for purposes of adjusting timing for subsequent contentions for access to the shared RF spectrum band, as described in more detail elsewhere herein. Or, in some cases, a transmitting device may use enhanced techniques for detecting collisions itself—e.g., by detecting energy levels during transmission gaps in a time-domain energy signature transmitted by the transmitting device.

Figure 2:
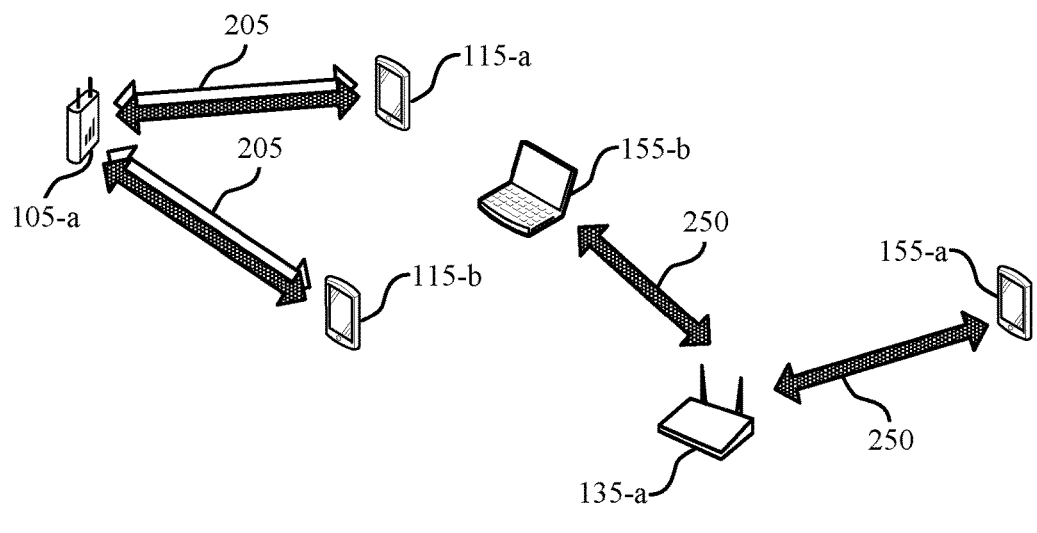
FIG. 2 illustrates an example of a wireless communications subsystem that supports collision reporting for multiple RAT co-existence in accordance with various aspects of the present disclosure.

FIG. 2 illustrates an example of a wireless communication environment 200 for collision feedback in a shared radio frequency spectrum band, in accordance with various aspects of the present disclosure. Base station 105-a, UE 115-a, and UE 115-b may communicate with one another using dedicated spectrum (e.g., licensed spectrum), the shared spectrum (e.g., unlicensed spectrum), or both via communication links 205. AP 135-a, STA 155-a, and STA 155-b may communicate with one another using the shared spectrum via WLAN communication links 250. In one example, UE 115-a, UE 115-b, and base station 105-a may be LTE-U capable devices and STA 155-a, STA 155-b, and AP 135-a may be Wi-Fi devices.

Base station 105-a may perform a CCA to determine if the shared spectrum is occupied by other transmitting devices (e.g., AP 135-a, STA 155-a, or STA 155-b). In the event that the CCA passes, the base station 105-a may transmit a channel reservation signal, such as a CUBS, followed by one or more subframes of data. As described above, Wi-Fi AP 135-a may also perform an LBT procedure and transmit an RTS signal. In many deployments, Wi-Fi nodes, such as Wi-Fi AP 135-a, may be synchronized so as to perform LBT procedures and transmit RTS signals at approximately the same time. Furthermore, in some deployments LTE nodes that may use shared RF spectrum (e.g., an LTE node that uses shared RF spectrum for license assisted access (LAA)) may also be synchronized to perform LBT procedures and begin transmitting a CUBS at approximately the same time that Wi-Fi nodes transmit an RTS signal. In the event of a collision of RTS signals among Wi-Fi nodes, each node may recognize the collision and adjust their respective contention windows according to established techniques, and thus fair access to the medium may be provided as between these devices. However, also as mentioned above, if an LTE node, such as an LTE base station 105-a, performs a CCA and begins transmitting a CUBS, a Wi-Fi node that transmits an RTS at the same time may detect the collision and perform a CW backoff while the LTE node may not, which may result in unfair medium access in favor of the LTE nodes.

To address such issues that may arise using LTE-based transmissions in unlicensed frequency bands, the LTE devices such as UE 115-a may employ techniques to detect and report such collisions. Reports of collisions may be used by a transmitting LTE node to modify CW sizes in accordance with established techniques to provide fairness in access to the wireless medium as compared to the Wi-Fi nodes. Although detecting a collision may be discussed in the context of collisions with an RTS signal, the following techniques may be similarly used for detecting collisions with other transmissions such as ACK packets, association requests, or other short frames.

Figure 3A:
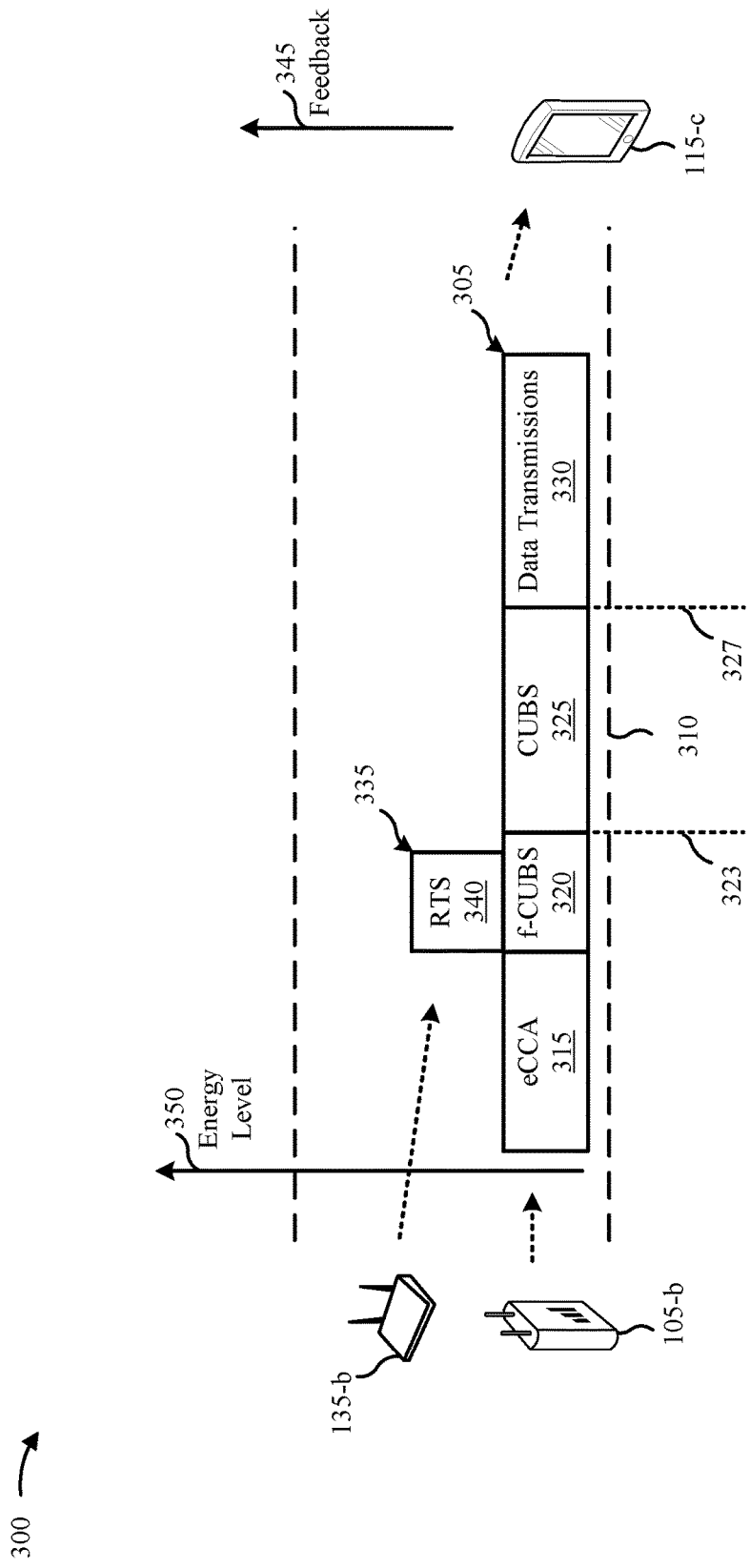
FIGS. 3A and 3B illustrate examples of LTE transmission in a shared radio frequency spectrum colliding with Wi-Fi communications in accordance with various aspects of the present disclosure.
Figure 3B:
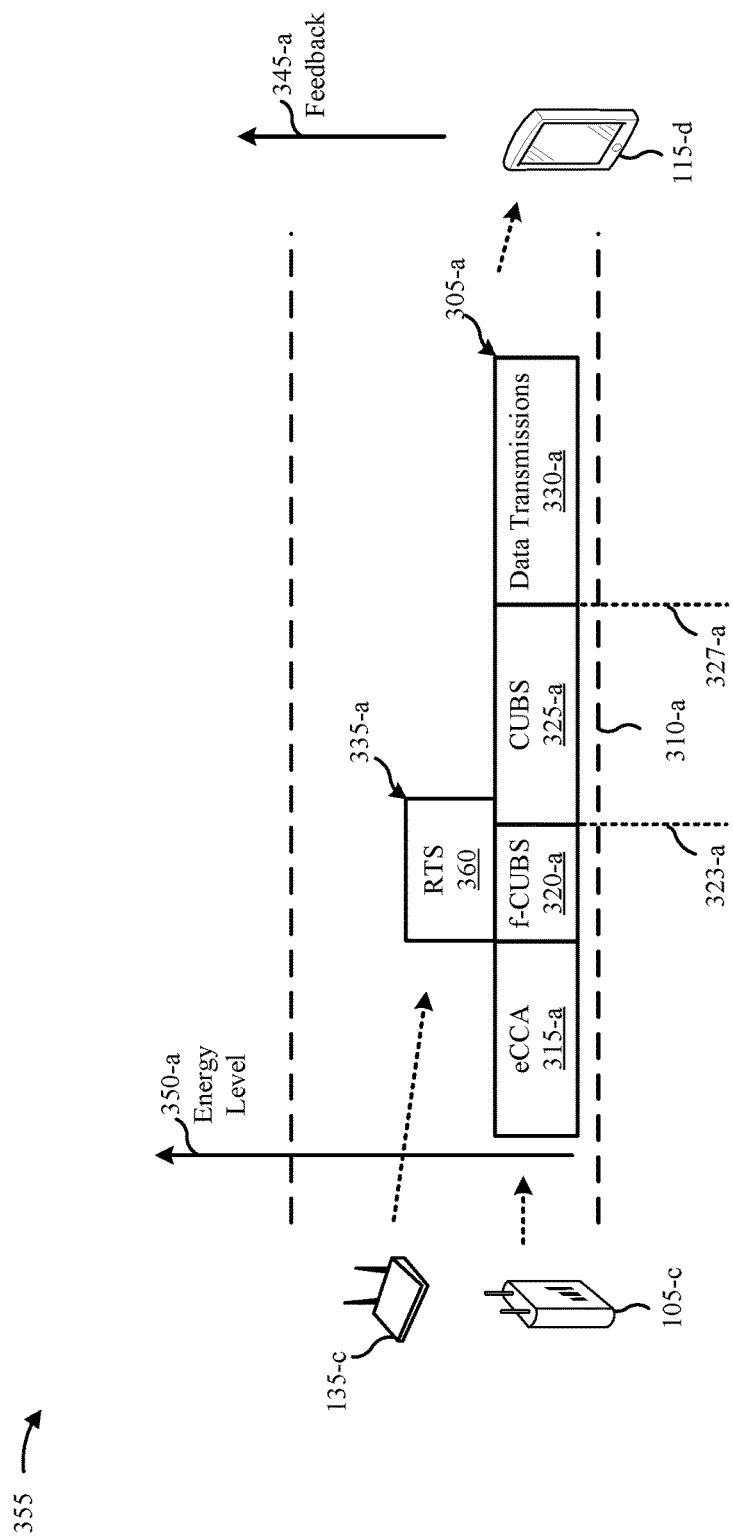

FIGS. 3A and 3B illustrate examples of LTE transmission in a shared radio frequency spectrum colliding with Wi-Fi communications in accordance with various aspects of the present disclosure. In the example 300 of FIG. 3A, a base station 105-b may transmit an LTE transmission 305 using a channel of a shared RF spectrum band 310. The LTE transmission may begin with a CCA or enhanced CCA (eCCA) 315. If the CCA 315 passes, the LTE base station 105-b may transmit a channel reservation signal, which in this example is a CUBS 325. Additionally, a fractional CUBS (f-CUBS) 320 may be transmitted for a fraction of a symbol period (e.g., orthogonal frequency division multiplexing (OFDM) symbol period, etc.) to align the start of CUBS 325 with the start of a symbol boundary 323. In some examples, the CUBS 325 may occupy one or more symbol periods to allow data transmissions 330 to begin at the start of a data transmission boundary 327, which may correspond to the start of a subframe, and that may be synchronized among nodes that are transmitting using the channel of the shared RF spectrum band 310. The LTE transmission 305 may be received at a UE 115-c.

While the base station 105-b is performing CCA 315, a Wi-Fi AP 135-b may also perform a CCA that happens to clear at the same time as CCA 315. The Wi-Fi AP 135-b may transmit Wi-Fi transmission 335 during at least a portion of the f-CUBS 320 and CUBS 325 transmission. The Wi-Fi transmission 335 may include a control frame, such as RTS 340, for example. The Wi-Fi node that was to receive the RTS 340 may not successfully receive and decode the RTS 340 due to the f-CUBS 320 transmission—and as a result will not transmit a CTS back to Wi-Fi AP 135-b. Because the Wi-Fi AP 135-b does not receive a CTS, the Wi-Fi AP 135-b recognizes that a collision has occurred and performs a CW backoff operation. The LTE base station 105-b, however, will continue to transmit CUBS 325 and data transmissions 330. According to some examples, the UE 115-c may detect that both the F-CUBS 320 and the RTS 340 overlap, and that there is a collision. The UE 115-a may transmit feedback 345 to notify the base station 105-b that a collision occurred, which the base station 105-b may use to adjust CW timing (e.g., to have a similar adjusted CW as Wi-Fi AP 135-b after collision of transmissions 305 and 335).

In some examples, the base station 105-c may utilize sensing based interrupts per transmission (IPT) method to detect possible colliding transmissions during certain time periods, and perform CW adaptation based at least in part on this number to help provide fairness in channel access. Such techniques enhance channel access fairness, and do not require feedback related to collisions from any particular receiver for a transmission. A collision in a particular transmission, however, may still cause Wi-Fi AP 135-c to perform a CW backoff, while the LTE base station 105-c continues with useful data transmission. For example, because the RTS 340 does not overlap with data transmissions 330, the data transmissions 330 are not interfered with and the UE 115-c may successfully receive and decode the data contained in the data transmissions 330. For a Wi-Fi AP 135-b, the duration of RTS 340 may depend upon the transmission rate being used, and may be, for example, 52 μs for 6 Mbps; 36 μs for 12 Mbps; and 28 μs for 24 Mbps.

FIG. 3B illustrates an example 355 in which RTS 360 has a longer duration, extending beyond OFDM symbol boundary 323-a, but still not extending to data transmission boundary 327-a. The remainder of example 355 is similar to example 300 of FIG. 3A. In such examples, the impact of the RTS 360 is limited to f-CUBS 320-a and a portion of CUBS 325-a, but does not impact data transmissions 330-a between LTE base station 105-a and UE 115-d.

According to various examples of the present disclosure, a UE 115 may detect a collision with the transmission of an RTS 340 or 360. In the example of FIG. 3A, UE 115-c may detect the collision and transmit feedback 345 to notify base station 105-b of the collision. The base station 105-b may modify its CW in response to the notification (e.g., in order to behave in a similar manner as Wi-Fi AP 135-b and provide fairness in access to the channel of the shared RF spectrum band 310). In order to detect the collisions illustrated in FIGS. 3A and 3B, UE 115-c or UE 115-d may continuously decode during DRX "on" durations to attempt to decode the RTS 340 or RTS 360. For example, the UE 115 may wake up before being ready to receive first grant and start decoding. If the UE 115 decodes RTS 340 or RTS 360, feedback 345 is provided to base station 105, and the UE 115 may still receive data transmissions 330. The UE 115 may report the feedback, for example, via a physical uplink control channel (PUCCH), or physical uplink shared channel (PUSCH) using either a licensed or shared radio frequency spectrum band.

In other examples, the UE 115 may sense an energy level, such as energy levels 350 and 350-a, and determine that a collision likely occurred with RTS 340 or RTS 360 based at least in part on sensed energy levels. In some examples, the UE 115 may continuously perform a CCA during its DRX on duration to sense energy levels of the channel of the shared RF spectrum band 310. The UE 115 may, for example, wake up before being ready to receive a first grant and initiate sensing of energy levels. If the UE 115 detects increased energy at the beginning of a transmit opportunity (TxOP) that lasts less than or equal to a maximum RTS duration, the UE may report a collision to the base station 105. The UE 115 may still receive data transmissions 330. The UE 115 may report the feedback 345, for example, via the PUCCH or PUSCH using either a licensed or unlicensed radio frequency spectrum band.

Figure 4:
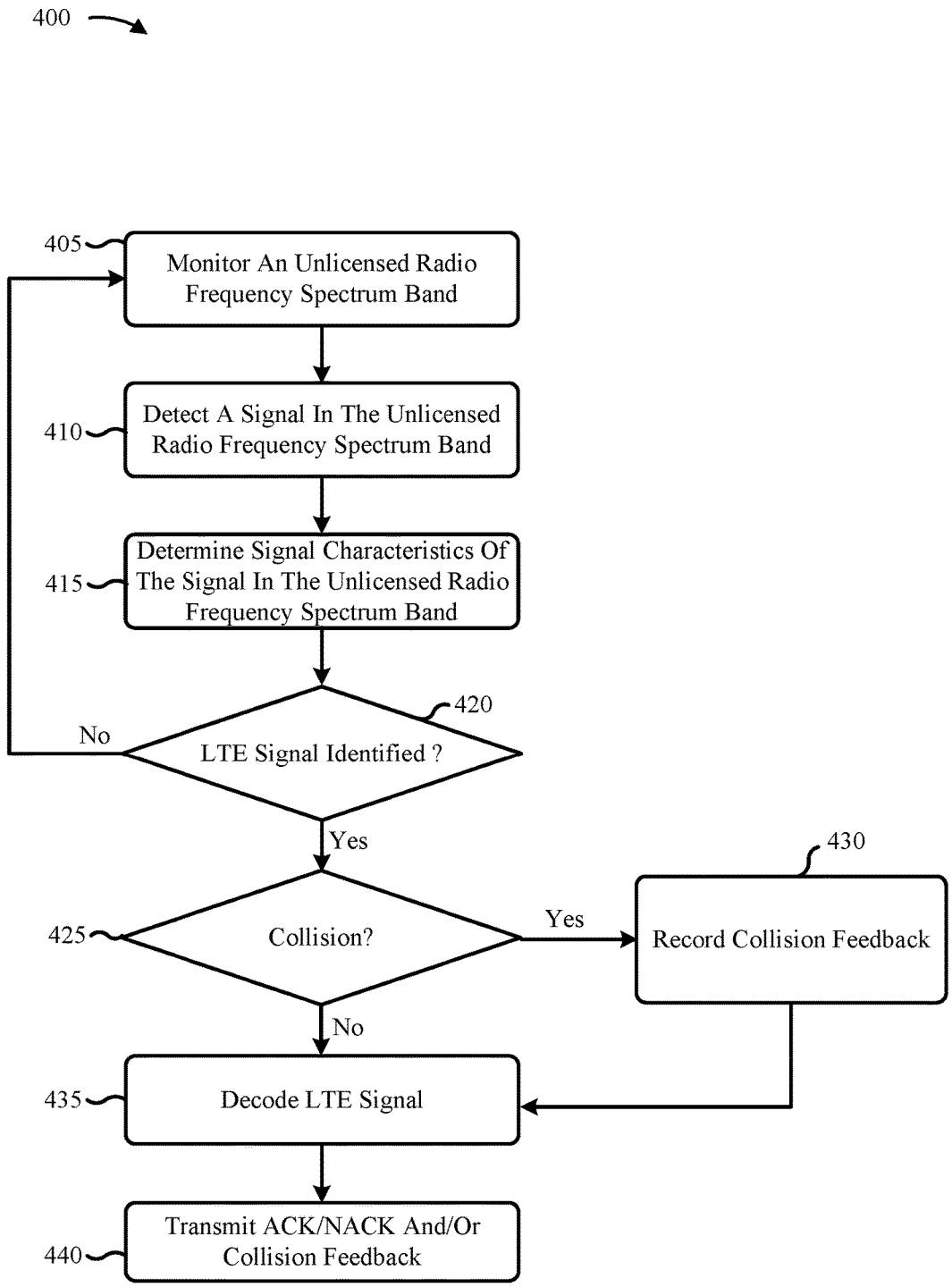
FIG. 4 illustrates a flow chart for a wireless device that supports collision reporting for multiple RAT co-existence in accordance with various aspects of the present disclosure.

FIG. 4 illustrates an example of a flow chart 400 for collision detection and feedback in accordance with various aspects of the present disclosure. Flow chart 400 may illustrate aspects of collision detection and feedback and may be implemented in a UE 115 as described above with reference to FIGS. 1-3. In some examples, a device, such as a UE 115, may monitor an unlicensed radio frequency spectrum band, as indicated at block 405. Such monitoring may be performed, for example, during a UE's DRX on duration. In some examples, the device may start monitoring a certain time period before being ready to receive a first downlink grant in order to monitor the channel for a collision.

The device, based at least in part on the monitoring, may detect a signal in the unlicensed radio frequency spectrum band, as indicated at block 410. The signal may be detected through attempting to decode received signals on the unlicensed radio frequency spectrum band, in some examples. In certain examples, the device may perform energy sensing to detect signals that may be present in the unlicensed radio frequency spectrum band.

At block 415, the device may determine signal characteristics of the signal in the shared radio frequency spectrum band. Such characteristics may be, in some examples, the information decoded from the signal if the device is attempting to decode received signals. In other examples, the signal characteristics may be sensed energy levels of the shared radio frequency spectrum band. In certain examples, the signal characteristics may be the sensed energy levels of the shared radio frequency spectrum band along with time durations that different energy levels are sensed.

The device, based at least in part on the determined signal characteristics, may then determine if an LTE signal is identified, as indicated at block 420. In some examples, the determination of an LTE signal may be based on decoding all or a portion of a CUBS transmission. In certain examples, the determination of an LTE signal may be based at least in part on receiving and decoding all or a portion of data transmissions that are transmitted following a channel reservation signal such as a CUBS. In the event that an LTE signal is not identified, the operations of block 405 may be repeated.

The device, based at least in part on the determined signal characteristics, may then determine if there was a collision, as indicated at block 425. In some examples, the determination of a collision may be based at least in part on decoding the RTS transmission from a Wi-Fi node and also decoding all or a portion of an LTE transmission. In certain examples, the determination of a collision may be based at least in part on sensed energy levels that are above a threshold value that indicates another node has attempted to transmit. In other examples, determination of a collision may be based at least in part on sensed energy levels at a first level for a first time period that corresponds to a possible duration of an RTS transmission, and sensed energy levels below the first level following the first time period.

In the event that a collision is detected, the device may record collision feedback to be provided to an LTE node (e.g., a base station 105), as indicated at block 430. The feedback may be reported, for example, via a PUCCH or PUSCH using either a licensed or the shared radio frequency spectrum band. In some examples, the feedback may be transmitted following the reception of data transmissions associated with the LTE transmission.

In the event that a collision is not detected at block 425, or following the recording of collision feedback at block 430, the device may decode the LTE signal, as indicated at block 435. The LTE signal may be decoded, for example, through established decoding techniques associated with LTE transmissions.

At block 440, the device may transmit feedback to the transmitting LTE node, which may include ACK/NACK feedback and collision feedback. The feedback may be reported, for example, via a PUCCH or PUSCH using either a licensed or the shared radio frequency spectrum band. In some examples, the feedback may be transmitted following the reception of data transmissions associated with the LTE transmission.

Figure 5A:
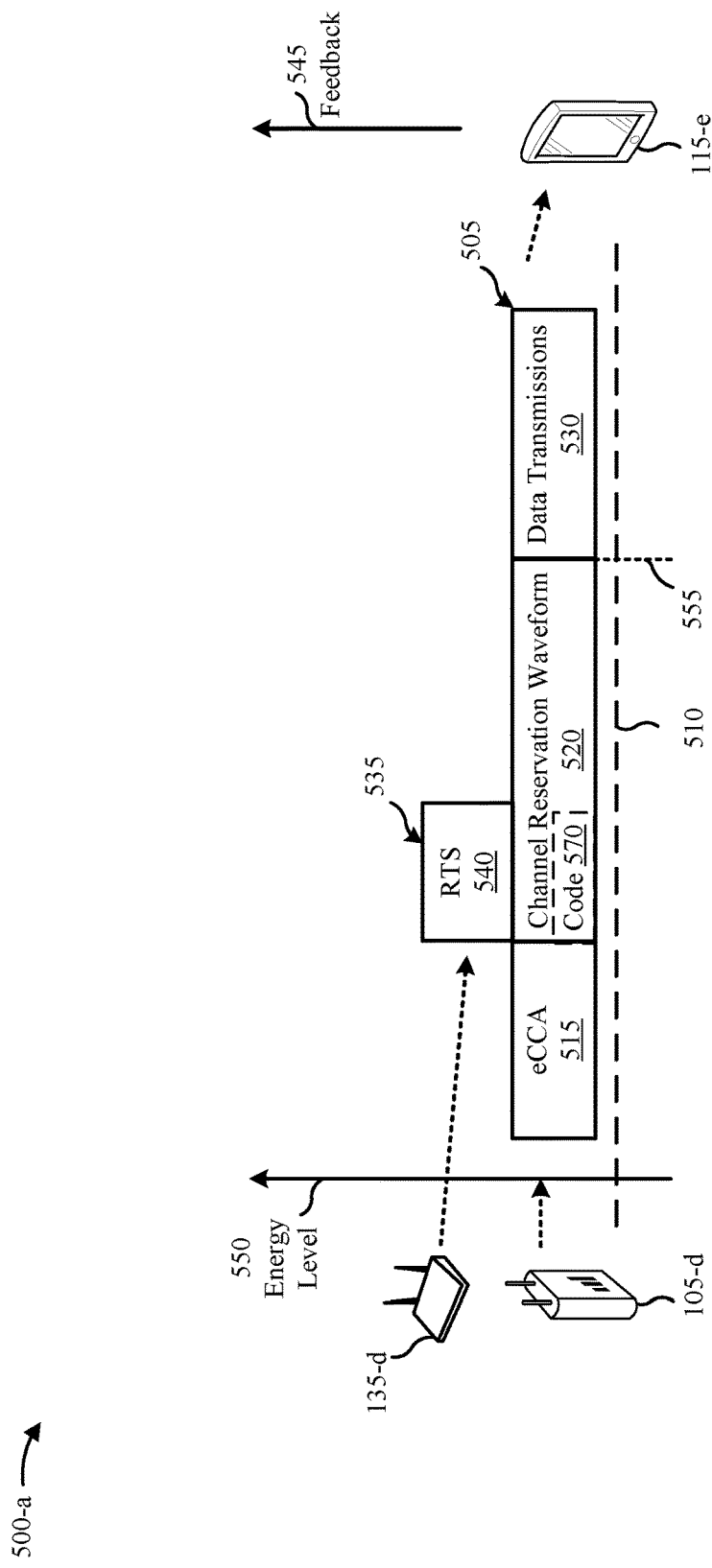
FIGS. 5A and 5B illustrates an example of an LTE transmission with a channel reservation signal in a shared radio frequency spectrum colliding with Wi-Fi communication, in accordance with various aspects of the present disclosure.

FIG. 5A illustrates an example 500-a of LTE transmission in a shared radio frequency spectrum colliding with Wi-Fi communications in accordance with various aspects of the present disclosure. In the example 500-a of FIG. 5A, a base station 105-d may transmit an LTE transmission 505 using a channel of a shared RF spectrum band 510. The LTE transmission may begin with a CCA or eCCA 515. If the CCA 515 passes, the LTE base station 105-b may transmit a channel reservation waveform 520.

In some examples, the channel reservation waveform 520 may be a non-OFDM (e.g., time-domain), unique waveform that may be decoded by UE 115-e. The channel reservation waveform 520 may start at the beginning of a TxOP (e.g., following a successful CCA 515) and may span a first fractional OFDM symbol and first OFDM symbol following eCCA 515 (e.g., in place of f-CUBS and/or CUBS of FIGS. 3A and 3B). In some examples, the channel reservation waveform 520 may include a preamble that spans at least a duration of the transmission of RTS 540 and may include at least a first code section 570 including a preamble sequence.

For example, the preamble may be a minimum length corresponding to a maximum duration of a transmission of RTS 540 and may extend to the next LTE symbol boundary. In other examples, the preamble may extend for at least one LTE symbol duration, up to the next LTE symbol boundary (e.g., between one and two LTE symbols in duration, etc.).

The first code section 570 may have a duration that is less than an expected transmission of RTS 540 (e.g., less than a longest expected duration, less than a shortest expected duration, etc.), in order to enhance the likelihood of interference from the transmission of RTS 540 inhibiting the ability of UE 115-*e* to decode code section 570. In the event of a collision, UE 115-*e* may fail to decode all of a portion of the code section 570 due to interference from RTS 540 in a Wi-Fi transmission 535 from Wi-Fi AP 135-*d*.

In some examples, the channel reservation waveform 520 may be defined as a new waveform for a fractional OFDM symbol and optionally all or part of a first OFDM symbol, in order to help ensure RTS 540 interference can be detected in the channel reservation waveform 520. In some examples, an initial deferral of 43 μs may be present prior to an RTS 540, and the UE 115-*e* may assume that 43 μs before a TxOP begins, the channel of the shared RF spectrum band 510 will be idle. In some examples, the channel reservation waveform 520 is a time-domain waveform and includes information to designate a boundary 555 between the channel reservation waveform 520 and data transmissions 530. In the event that the UE 115-*e* is not able to decode all or part of the channel reservation waveform 520, the UE 115-*e* may report feedback 545 to the base station 105-*d* of the collision.

In some examples, the base station 105-*d* may adjust a CW size based at least in part on the collision feedback. The adjustment to the CW size may be, for example, a linear increase of the CW size, an exponential increase (e.g., doubling) in CW size, or other CW adjustment technique. In some examples, the CW adjustment technique is selected to provide an adjustment to the CW as would similarly be done in Wi-Fi AP 135-*d*. In certain examples, the base station 105-*d* may set the CW size for a subsequent contention procedure at a large enough value to allow Wi-Fi AP 135-*d* a chance to win contention of the channel of the shared RF spectrum band 510. For example, the base station 105-*d* may increase the CW and backoff for a maximum time period of the CW instead of a randomly selected portion of the CW. In still further examples, the UE 115-*e*, upon detection of a collision, may not look for downlink grants if all or a portion of the channel reservation waveform 520 is not decoded.

Figure 5B:
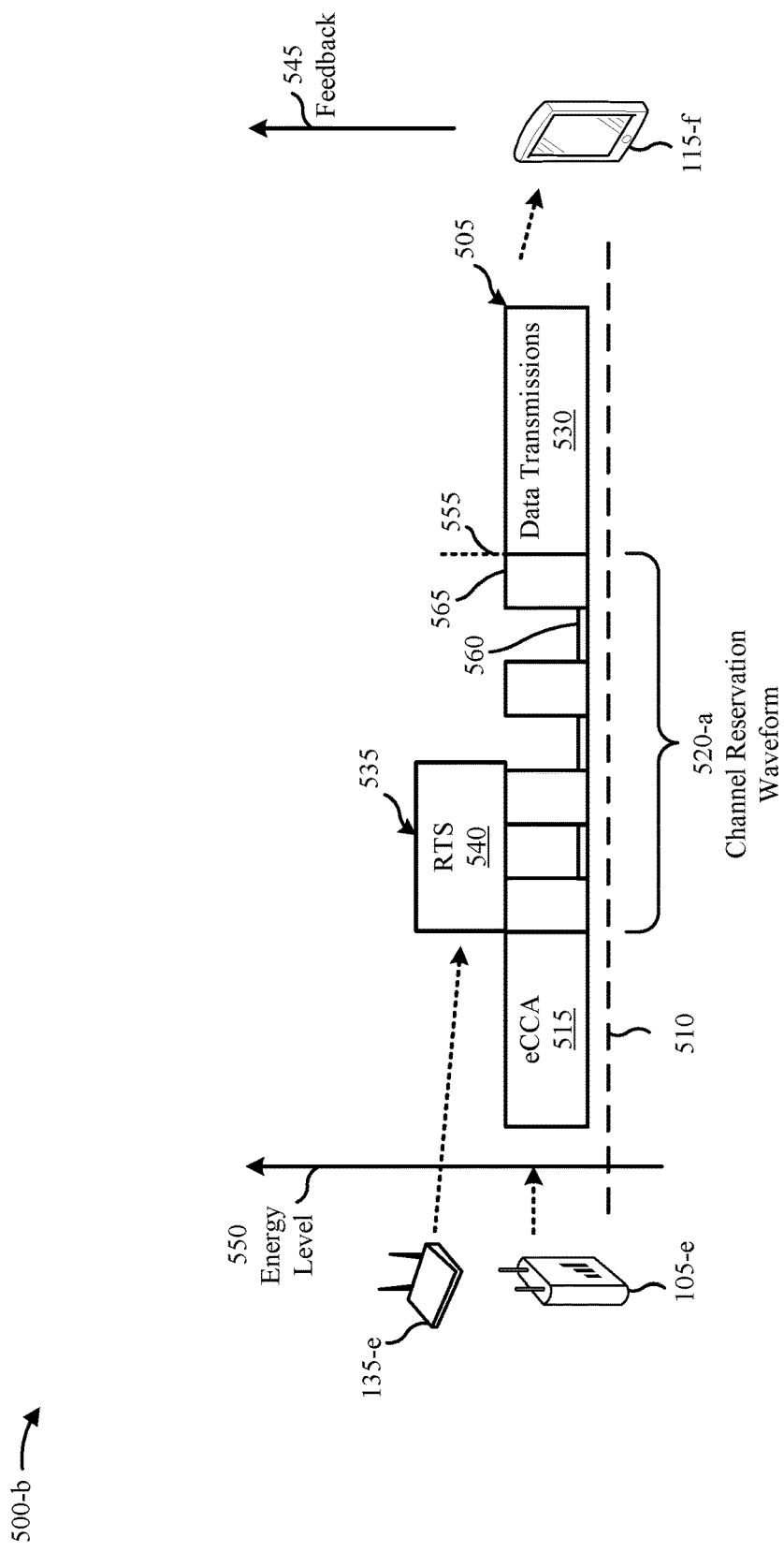

FIG. 5B illustrates an example 500-*b* of LTE transmission in a shared radio frequency spectrum colliding with Wi-Fi communications in accordance with various aspects of the present disclosure. Example 500-*b* illustrates an alternative channel reservation waveform 520-*a* that includes a time-domain energy signature for collision detection. In some examples, the time-domain energy signature may include a pattern of high energy periods 565 and low energy periods 560 (which may also be referred to as gaps) that functions to reserve the channel while allowing the receiver (e.g., UE 115-*f*) and/or transmitter (e.g., base station 105-*e*) to detect an interfering signal. A low energy period 560 may be characterized by reduced transmission power or no transmission power. In some examples, the channel reservation waveform 520-*a* may include a first high energy period 565 for a first duration, a low energy period 560 for a second duration, and a second high energy period 565 for a third duration. In some examples, the base station 105-*e* may implement the time-domain energy signature by transmitting a signal during a first high energy period 565, discontinuing the signal transmission (e.g., not transmitting energy over the shared channel) during the second low energy period 560, and resuming the signal transmission for the third high energy period 565. In some cases, channel reservation waveform 520-*a* may include additional low energy periods 560 (e.g., a second low energy portion for a fourth duration and a third high energy portion for a fifth duration, etc.).

The UE 115-*f* may be pre-configured (e.g., factory coded) or semi-statically network configured (e.g., via a pattern indicator) to determine a signature pattern used by the base station 105-*e*. The UE 115-*f* may use the known pattern to detect a signal associated with the channel reservation waveform 520-*a* and determine whether a transmission (e.g., RTS 540) has been transmitted that collides with channel reservation waveform 520-*a*. The base station 105-*e* may also use the low energy period 560 of the channel reservation waveform 520-*a* to detect a collision with another transmission. For instance, the UE 115-*f* and/or the base station 105-*e* may identify that the energy level 550 detected during an expected low power duration/low energy period 560 is above a threshold, and the UE 115-*f* and/or the base station 105-*e* may determine that a colliding RTS 540 has been transmitted. Similarly, if the UE 115-*f* and/or base station 105-*e* determine that the energy level 550 detected during the expected low power duration is below a threshold, UE 115-*f* and/or base station 105-*e* may determine that interfering collision between transmissions has not occurred. In some cases, the energy level and timing associated with the high energy signal transmissions may be determined based at least in part on parameters associated with a different radio access technology (e.g., energy sensing interval, maximum and/or minimum transmission power of Wi-Fi devices, frame structures, etc.). Similarly, the threshold used to determine whether a colliding transmission is detected may be determined based at least in part on transmission power parameters for devices using a different radio access technology and/or observed channel conditions.

In one example, the one or more high energy periods 565 of the time-domain energy signature extend for a period that coincides with or is longer than an energy sensing slot (e.g., 9 μs) and the following one or more low energy portions extend for a period of between one and two energy sensing slots (e.g., a duration between 9 μs and 18 μs). In some examples, the duration of the low energy portions is less than a maximum allowed period for discontinuous transmissions that to do not trigger the use of additional LBT mechanisms prior to resuming the transmissions. For example, the duration of the low energy portions may be less than a short interframe space (SIFS) (e.g., <16 μs) or a point coordination function (PCF) interframe space (PIFS) (e.g., <25 μs), to ensure that control over the channel can be maintained. In some cases, the combined duration of the first high energy portion, first low energy portion, and second high energy portion may have a minimum duration corresponding to the duration of an interfering transmission (e.g., maximum duration of an RTS 540) and may extend up to an LTE symbol boundary. Thus, the second high energy portion may span a fractional OFDM symbol or more than one OFDM symbol. Alternatively, an f-CUBS may be transmitted in place of or following the second high energy portion to span a fractional OFDM symbol following the low energy duration. A CUBS may be transmitted in the following OFDM symbol. In the event that the UE 115-*f* and/or the base station 105-*e* determines that the energy level 550 detected during an expected low energy period 560 is greater than a threshold, the UE **115-*f* may report feedback 545 to the base station 105-*e*, indicating that a collision has occurred between the channel reservation waveform 520-*a* and RTS 540. Or the base station 105-*e* may determine the collision has occurred independent of feedback from UE 115-*f* based on the detected energy level 550**.

In some embodiments, the channel reservation waveform **520-*a* may include multiple low energy periods 560. For instance, a first low energy period 560 may overlap with an interfering signal, such as RTS 540, and the channel reservation waveform 520-*a* may include a second low energy period 560 at a random or pseudo-random time during the remainder of the channel reservation waveform 520-*a*. The second low energy portion may enable the UE 115-*f* and/or the base station 105-*e*** to detect a colliding transmission, such as another channel reservation waveform being transmitted from a neighboring base station. In some cases, the energy detection threshold or the timing used during the first and second low energy portions may be different.

In some examples, the base station **105-*e* may adjust a CW size based at least in part on the collision feedback. The adjustment to the CW size may be, for example, a linear increase of the CW size, an exponential increase (e.g., doubling) in CW size, or other CW adjustment technique. In some examples, the CW adjustment technique is selected to provide an adjustment to the CW as would similarly be done in Wi-Fi AP 135-*e*. In certain examples, the base station 105-*e* may set the CW size for a subsequent contention procedure at a large enough value to allow Wi-Fi AP 135-*e* a chance to win contention of the channel of the shared RF spectrum band 510. For example, the base station 105-*e* may increase the CW and backoff for a maximum time period of the CW instead of a randomly selected portion of the CW. In still further examples, the UE 115-*f*, upon detection of a collision, may not look for downlink grants if all or a portion of the channel reservation waveform 520-*a*** is not decoded.

Figure 6:
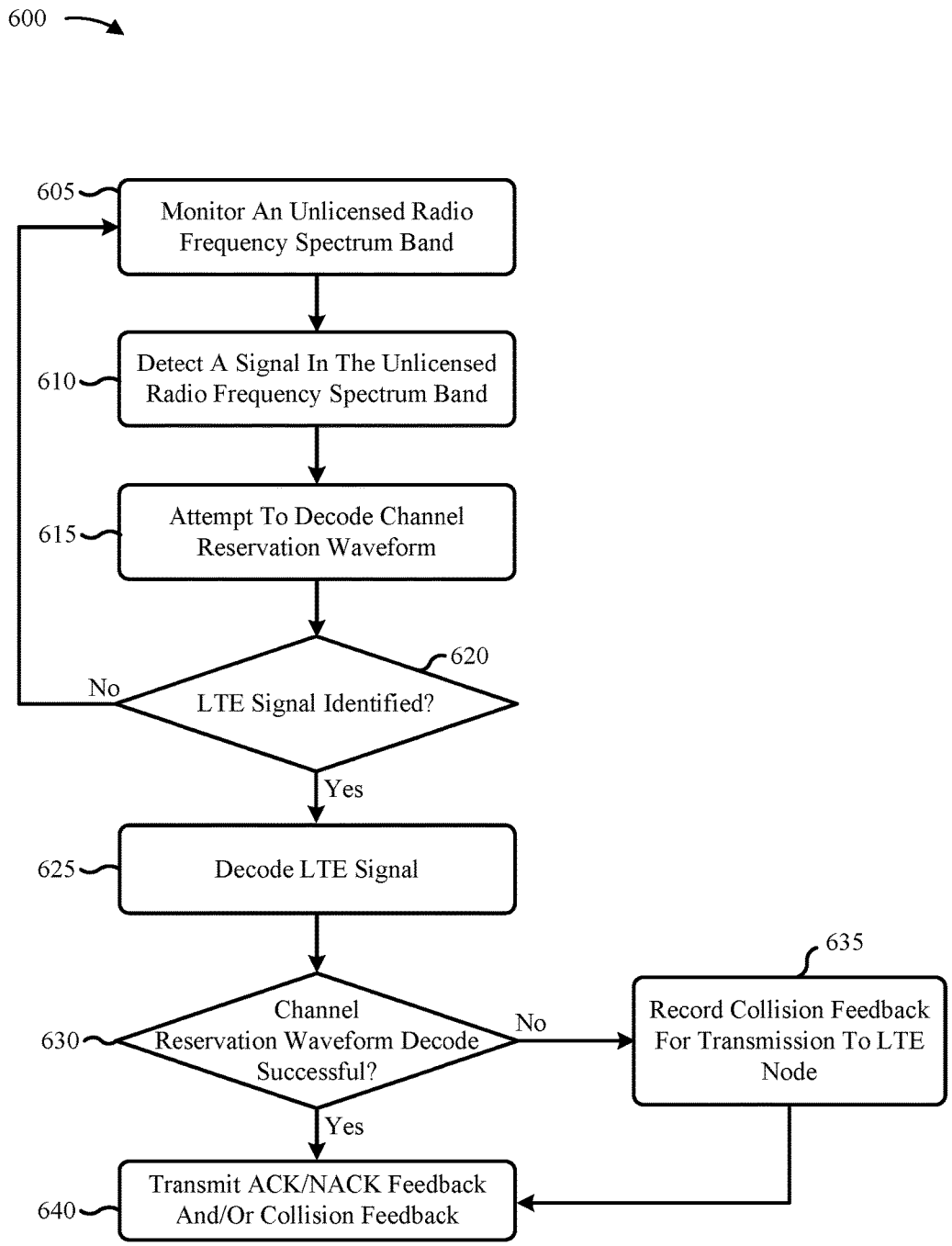
FIG. 6 illustrates another flow chart for a wireless device that supports collision reporting for multiple RAT co-existence in accordance with various aspects of the present disclosure.

FIG. 6 illustrates an example of a flow chart 600 for collision detection and feedback in accordance with various aspects of the present disclosure. Flow chart 600 may illustrate aspects of collision detection and feedback and may be implemented in a UE 115 as described above with reference to FIGS. 1-5. In some examples, a device, such as a UE 115, may monitor a shared radio frequency spectrum band, as indicated at block 605. Such monitoring may be performed, for example, during a DRX on duration scheduled for the device. In some examples, the device may start monitoring a certain time period before being ready to receive a first downlink grant in order to monitor the channel for a collision.

The device, based at least in part on the monitoring, may detect a signal in the shared radio frequency spectrum band, as indicated at block 610. The signal may be detected through attempting to decode received signals on the shared radio frequency spectrum band, in some examples. In certain examples, the device may perform energy sensing to detect signals that may be present in the shared radio frequency spectrum band.

At block 615, the device may attempt to decode a channel reservation waveform. As discussed above, the channel reservation waveform may be a predefined waveform that may be decoded for the purposes of detecting a collision, such as channel reservation waveforms 520 and **520-*a* as described with reference to FIGS. 5A and 5B. Attempting to decode the waveform may include, in some examples, attempting to decode a time-domain waveform, or a portion of a time-domain waveform within a certain period following the start of a TxOP. In some cases, at block 615** the device may instead detect an energy level during an expected transmission gap of a time-domain energy signature.

The device may then determine if an LTE signal is identified, as indicated at block 620. In some examples, the determination of an LTE signal may be based on decoding all or a portion of a the channel reservation waveform. In certain examples, the determination of an LTE signal may be based at least in part on receiving and decoding all or a portion of data transmissions that are transmitted following a channel reservation signal. In the event that an LTE signal is not identified, the operations of block 605 may be repeated.

In the event that an LTE signal is identified at block 620, the device may decode the LTE signal, as indicated at block 625. The LTE signal may be decoded, for example, through established decoding techniques associated with LTE transmissions.

The device may then determine if there was a collision through determining if the channel reservation signal was successfully decoded, as indicated at block 630. In some examples, the determination of a collision may be based at least in part on decoding a portion of a channel reservation signal.

In the event that the channel reservation waveform is not successfully decoded, a collision is detected, and the device may record collision feedback to be provided to a LTE node (e.g., a base station), as indicated at block 635. The feedback may be reported, for example, via a PUCCH or PUSCH using either a licensed or shared radio frequency spectrum band. In some examples, the feedback may be transmitted following the reception of data transmissions associated with the LTE transmission.

At block 640, the device may transmit feedback to the transmitting LTE node, which may include ACK/NACK feedback and collision feedback. The feedback may be reported, for example, via a PUCCH or PUSCH using either a licensed or shared radio frequency spectrum band. In some examples, the feedback may be transmitted following the reception of data transmissions associated with the LTE transmission.

Figure 7:
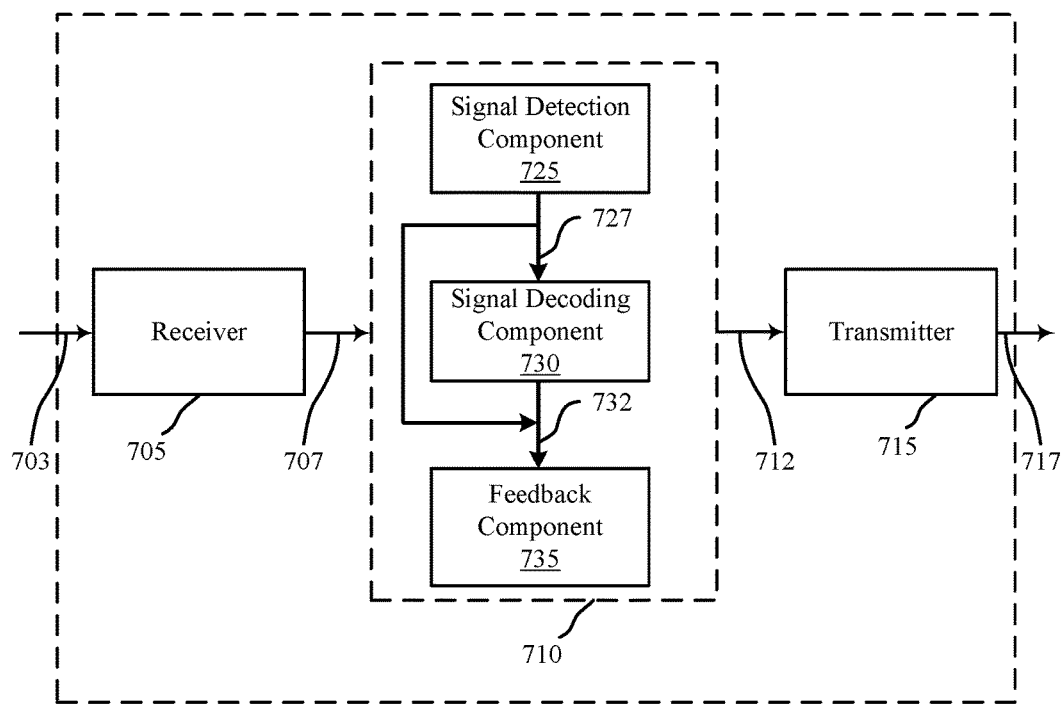
FIG. 7 shows a block diagram of a wireless device that supports collision reporting for multiple RAT co-existence in accordance with various aspects of the present disclosure.

FIG. 7 shows a block diagram of a wireless device 700 configured for collision feedback in accordance with various aspects of the present disclosure. Wireless device 700 may be an example of aspects of a base station 105 or UE 115 described with reference to FIGS. 1-6. Wireless device 700 may include a receiver 705, a collision detection component 710, or a transmitter 715. Wireless device 700 may also include a processor. Each of these components may be in communication with each other.

The receiver 705 may receive information such as packets, user data, or control information associated with various information channels (e.g., control channels, data channels, and information related to superposition coding based preamble design for LTE-U and Wi-Fi co-existence, etc.). Information may be passed on to the collision detection component 710, and to other components of wireless device 700. In some examples, the receiver 705 may receive a signal 703 over the shared radio frequency spectrum band that includes a first communication transmitted using a first radio access technology and a second communication transmitted using a second radio access technology, the second signal overlapping at least a portion of the first communication. The first communication may include a first collision detection portion (e.g., a preamble, channel reservation waveform, time-domain energy signature, etc.) and a second data portion. For instance, the receiver 705 may receive a signal 703 that includes a preamble signal transmitted over a frequency channel shared by the first RAT and the second RAT, the preamble signal having a predetermined preamble time duration associated with the first RAT and the preamble signal being identifiable by a first RAT and a second RAT.

In certain examples, the receiver 705 may receive a signal 703 transmitted by a first transmitter (e.g., associated with a first RAT, such as LTE) prior to a data portion of the transmission (e.g., collision detection portion of a communication). In some cases, the received signal 703 comprises a time-domain energy signature that includes a first high energy period and a subsequent first low energy period. In certain cases, the received signal 703 comprises a second high energy period, following the first low energy period, that extends to a signal transmission boundary associated with the first radio access technology. In some cases, the received signal 703 may include a second low energy period, following the first low energy period. The receiver 705 may pass a signal representation 707 (e.g., filtered, digitized, etc.) of the received signal 703 to collision detection component 710.

The collision detection component 710 may, in some examples, detect a signal in a shared radio frequency spectrum band based on the signal representation 707 received from the receiver 705. The collision detection component 710 may then determine whether a collision between the first communication and the second communication has occurred based at least in part on detecting the signal, and if a collision has occurred, may report the collision to a node of a wireless communications network. In certain examples, the collision detection component 710 may receive a signal representation 707 of a data transmission from a first transmitter over a shared radio frequency spectrum band, the data transmission transmitted using a first radio access technology (e.g., LTE), identify that a collision occurred prior to the data portion of the first communication between the first transmitter and a second transmitter that transmits over the shared radio frequency spectrum band using a second radio access technology (e.g., Wi-Fi), and report the collision to the first transmitter.

In certain examples, the collision detection component 710 may identify that the collision occurred based at least in part on an energy level detected during a preamble signal. In some examples, the collision detection component 710 may identify that the collision occurred based at least in part on identifying that an energy level detected during a low energy period of a time-domain energy signature is greater than a threshold. In some cases, collision detection component 710 may identify that a second collision occurred prior to the data transmission between the first transmitter and a third transmitter that transmits over the shared radio frequency spectrum band using the first radio access technology based at least in part on an energy level detected during a second low energy period of the time-domain energy signature.

The collision detection component 710 may include signal detection component 725, a signal decoding component 730, and a feedback component 735. The signal detection component 725 may perform signal detection to detect the presence of signals in a shared RF spectrum band based at least in part on the received signal representation 707, for example. In some examples, the signal detection component 725 may determine energy values based on the signal representation 707 that may be used to determine the presence or absence of a signal. The signal detection component 725 may pass a signal presence indicator 727 to signal decoding component 730. In some cases, signal detection component 725 may bypass signal decoding component 730 and may pass the signal presence indicator 727 directly to feedback component 735. For instance, signal detection component 725 may determine that a detected energy level is greater than a threshold value and that a collision has occurred between the first and second communications and may send the signal presence indicator 727 directly to feedback component 735.

The signal decoding component 730 may decode received signals, or attempt to decode received signals. For example, the signal decoding component 730 may receive signal representation 707 from receiver 705 and the signal presence indicator 727 indicating that a signal is present. Signal decoding component may then attempt to decode one or more of a RTS signal or a channel reservation signal included in the signal representation 707, as discussed above. The signal decoding component 730 may provide decoded signal information to one or more other components that may be used, for example, to determine the presence of a collision with another transmitter using the shared RF spectrum band. In some cases, signal decoding component 730 may provide a collision indicator 732 to feedback component 735 based on unsuccessfully decoding an RTS signal, a channel reservation signal, or a code segment in a channel reservation signal. The feedback component 735 may provide feedback related to received signals. Such feedback may include, for example, feedback relating to a detected collision. In certain examples, the feedback component 735 may receive an indication that data has not or has been successfully decoded, which may be used to determine the presence or absence of an interfering signal. Additionally or alternatively, the feedback component 735 may provide ACK/NACK feedback related to received data transmissions. Feedback component 735 may provide feedback information 712 to transmitter 715 for subsequent processing (e.g., mixing, mapping, coding, etc.) and transmission.

The transmitter 715 may transmit signals 717 received from other components of wireless device 700. In some examples, the transmitter 715 may be collocated with the receiver 705 in a transceiver component. The transmitter 715 may include a single antenna, or it may include a plurality of antennas. In some examples, the transmitter 715 may transmit feedback associated with collision determinations made by the collision detection component 710—e.g., based on the feedback information 712 received from feedback component 735.

Figure 8:
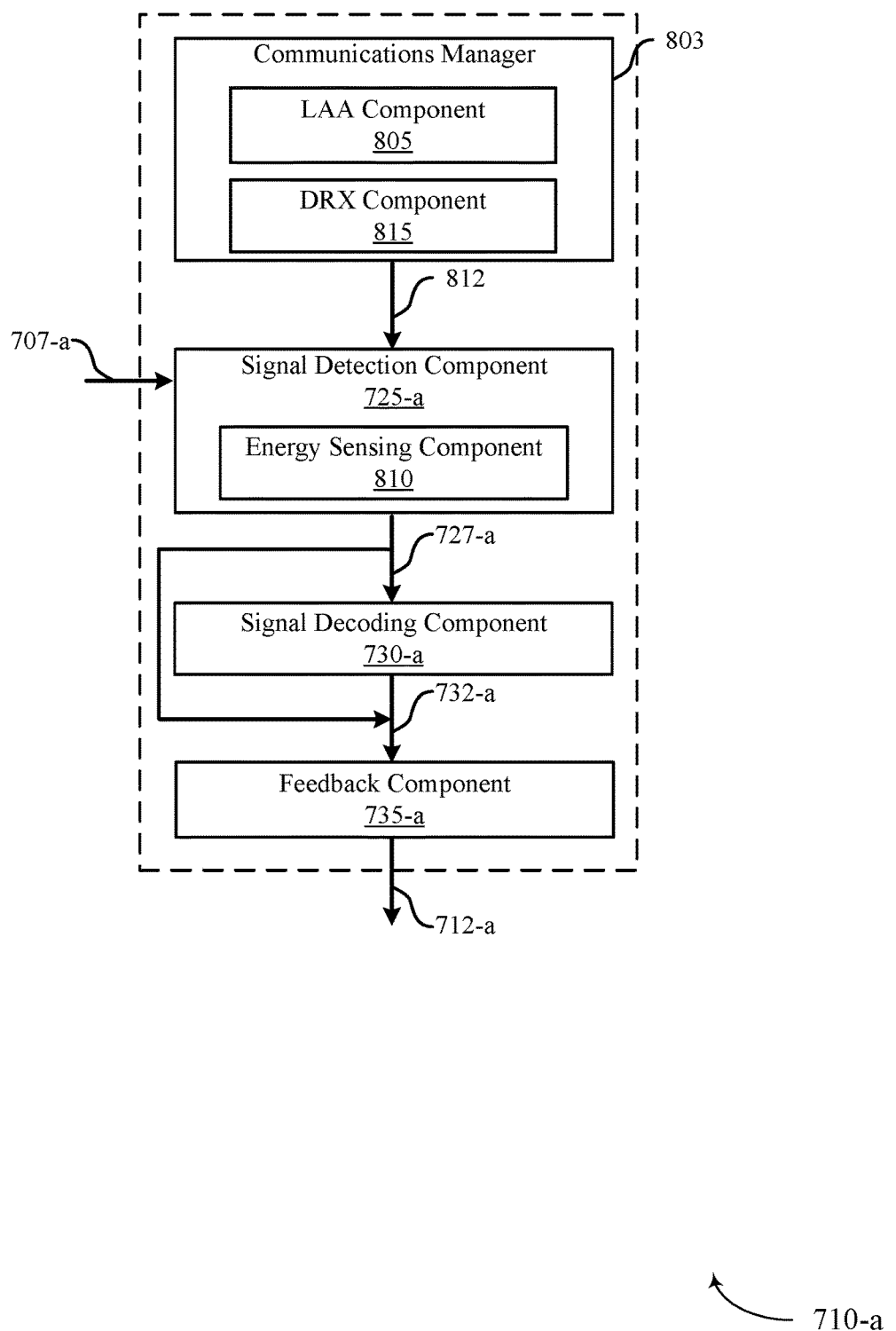
FIG. 8 shows a block diagram of a wireless device that supports collision reporting for multiple RAT co-existence in accordance with various aspects of the present disclosure.

FIG. 8 shows a block diagram a of a collision detection component 710-a which may be a component of a wireless device 700 for collision detection and feedback in accordance with various aspects of the present disclosure. The collision detection component 710-a may be an example of aspects of a collision detection component 710 described with reference to FIG. 7. The collision detection component 710-a may include signal detection component 725-a, a signal decoding component 730-a, and a feedback component 735-a. Each of these components may perform the functions described herein with reference to FIG. 7. The collision detection component 710-a may also include a communications manager 803, an energy sensing component 810, and a DRX component 815.

The communications manager 803 may enable operation of a device in a wireless communications system that utilizes shared resources. For instance, communications manager may include an License Assisted Access (LAA) component 805, which may perform operations related to license assisted access through a shared RF spectrum band, such as timing operations, synchronization operations, and LBT procedures, for example. The communications manager 803 may additionally include a DRX component 815, which may perform discontinuous reception operations, which may include waking up a receiver to receive signals at determined intervals. In some examples, the DRX component 815 may wake up a receiver with sufficient time prior to an expected reception to sense other signals that may be present on the shared RF spectrum band, as described herein with reference to FIGS. 2-7. Communications manager 803 may pass synchronization/scheduling information 812 to signal detection component 725-*a*, which may perform signal detection operations based on the received information 812.

Signal detection component 725-*a* may include the energy sensing component 810, which may sense energy levels on a shared RF spectrum band, that may be used, for example, to determine the presence of a signal on the shared RF spectrum band. The energy sensing component 810 also may provide information related to relative levels of sensed energy that may be used to determine a collision, as described herein with reference to FIGS. 2-7. As discussed with reference to FIG. 7, signal detection component 725-*a* may pass a signal presence indicator 727-*a* to either signal decoding component 730-*a* or feedback component 735-*a*. Signal decoding component 730-*a* may use the reception of the signal presence indicator 727-*a* to trigger a decoding operation (e.g., of a portion of a signal that occurs prior to a data portion of a communication). Feedback component 735-*a* may use the signal presence indicator 727-*a* to report a collision—e.g., if the signal presence indicator 727-*a* indicates that the energy level detected at energy sensing component 810 is above a threshold.

Figure 9:
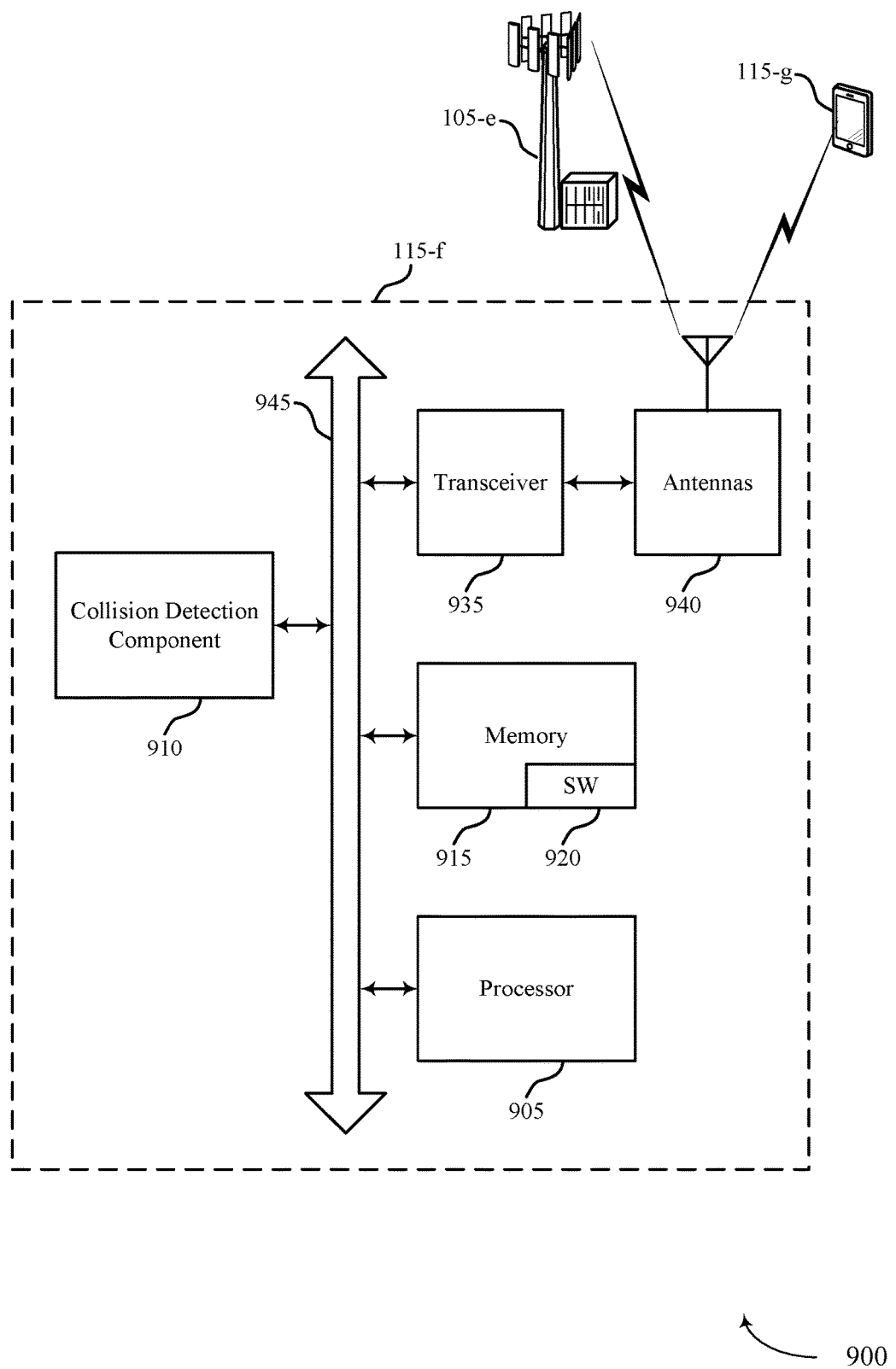
FIG. 9 illustrates a block diagram of a system including a device that supports collision reporting for multiple RAT co-existence in accordance with various aspects of the present disclosure.

FIG. 9 shows a diagram of a system 900 including a UE 115-*f* configured for collision detection and feedback in accordance with various aspects of the present disclosure. System 900 may include UE 115-*f*, which may be an example of a wireless device 700, or a UE 115 described herein with reference to FIGS. 1-8. UE 115-*f* may include a collision detection component 910, which may be an example of a collision detection component 710 described with reference to FIGS. 7-8. UE 115-*f* may also include components for bi-directional voice and data communications including components for transmitting communications and components for receiving communications. For example, UE 115-*f* may communicate bi-directionally with base station 105-*e* or UE 115-*g*.

UE 115-*f* may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*f* may include a single antenna 940, UE 115-*f* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., collision detection and feedback for LTE-U and Wi-Fi co-existence, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.).

Figure 10:
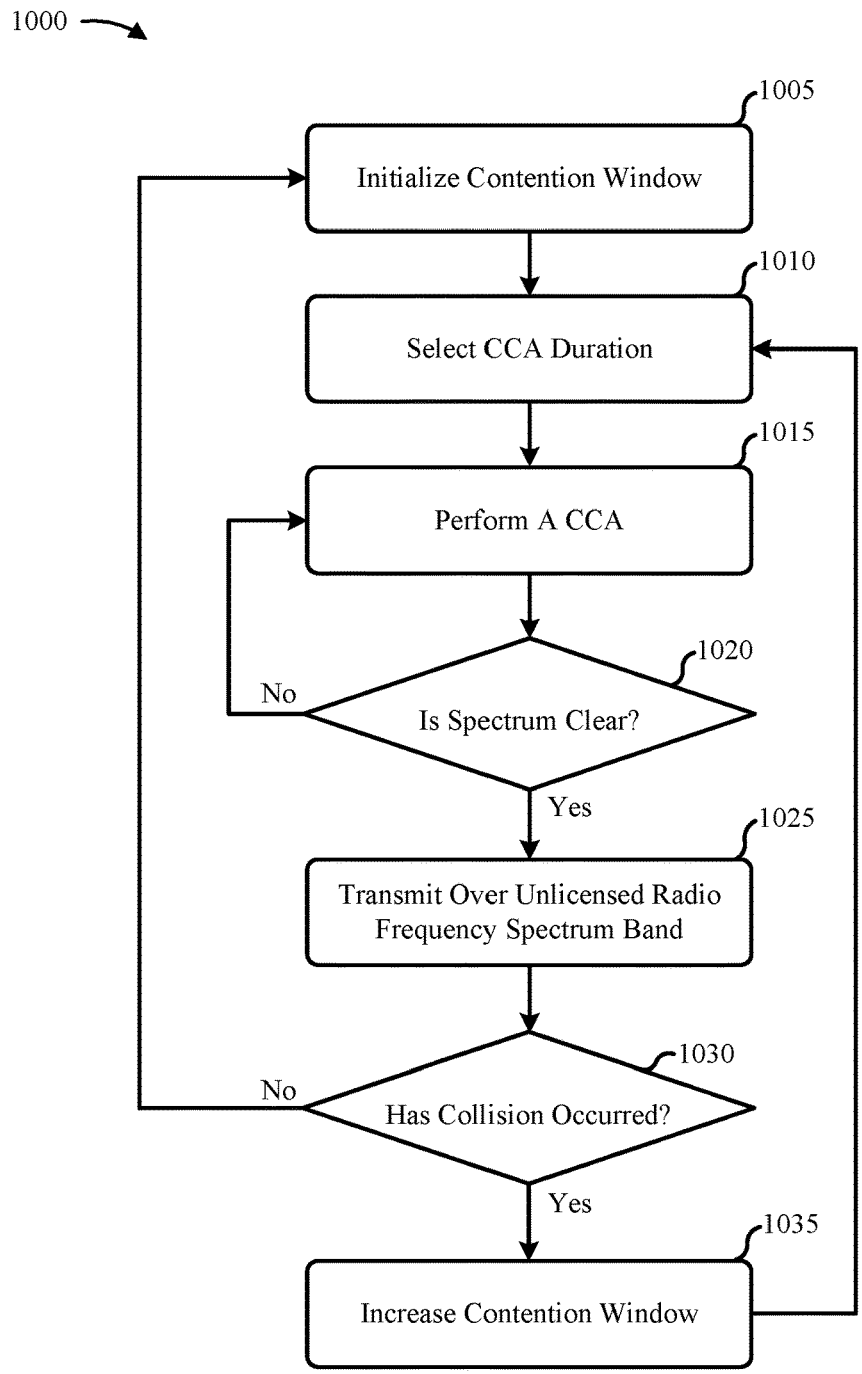
FIG. 10 illustrates a flow chart for a wireless device that supports collision reporting for multiple RAT co-existence in accordance with various aspects of the present disclosure.

FIG. 10 illustrates a flow chart 1000 for a wireless device that supports collision reporting for multiple RAT co-existence in accordance with various aspects of the present disclosure. Flow chart 1000 may illustrate aspects of collision detection and feedback implemented in a base station 105 as described above with reference to FIGS. 1-6.

In some examples, a device, such as a base station 105, may initialize a CW size prior to accessing a channel of a shared frequency spectrum band, as indicated at block 1005. In some examples, the CW size for the device may be selected based on an access category associated with upcoming data transmissions. The CW size may provide the device with a maximum duration for observing a shared channel prior to a transmission.

At 1010, the device may select a CCA duration to observe based on the CW size. In some cases, the device may randomly determine the CCA duration. For instance, a random number generator may be used to determine the CCA duration between a minimum duration and the CW size.

At 1015, the device may perform a CCA based on the selected CCA duration. Performing the CCA may include monitoring a portion of shared spectrum for the CCA duration prior to accessing the shared spectrum. In some cases, the CCA may be an eCCA. While performing the CCA the device may determine whether the CCA duration has expired and the desired portion of the shared spectrum is clear at 1020 (e.g., determine whether an interfering transmission is present on the shared spectrum). If the CCA duration has expired and the spectrum is clear (e.g., no interfering transmissions are detected) the device may begin transmitting over the shared radio frequency spectrum band. Otherwise, if the spectrum is not clear (e.g., an interfering transmission is detected) the device may wait for the spectrum to be clear and continue to decrement a timer (e.g., when an energy level of the channel is below a threshold, etc.) until the CCA duration has expired while the channel is clear at 1020.

At 1025, after determining the shared spectrum is clear, the device may transmit over the shared spectrum. Transmitting over the spectrum may include transmitting a channel reservation signal and a data signal (e.g., LTE transmission, etc.). The channel reservation signal may include an f-CUBS and/or CUBS, which may occupy one or more symbol periods to allow the data signal to begin at the start of a data transmission boundary associated with data transmissions for a radio access technology for the data signal (e.g., LTE subframe boundary, etc.).

In some examples, the channel reservation signal includes a preamble waveform that may be decoded by an LTE-U device and may be transmitted in place of the f-CUBS and/or CUBS before the data signal. The preamble waveform may be a non-OFDM waveform (e.g., time-domain waveform, etc.). In some examples, the preamble waveform spans at least the duration of an RTS signal associated with a different RAT (e.g., Wi-Fi, etc.), and extends to the next LTE symbol boundary. Additionally or alternatively, the preamble waveform spans between at least one and up to two LTE symbols. In some examples, the preamble waveform may include a first code section having a duration that is less than a shortest expected RTS transmission, in order to enhance the likelihood of interference from an RTS transmission inhibiting the ability of a UE 115 to decode the sequence in the code section. The sequence may be, for example, a code determined based on a transmitter identifier or other identifier. In some examples, the preamble waveform is a time-domain energy signature that includes high and low energy periods. In some cases, the device may transmit the high and low energy periods in a predetermined pattern. The device may then transmit a data portion of a communication after transmitting the time-domain energy signature.

At 1030, the device may determine whether a collision has occurred between the transmission and a transmission (e.g., and RTS) from a device using a different RAT (e.g., Wi-Fi). For instance, the device may determine whether an indication of a collision has been received from the intended UE for the transmission. And if no indication is received at 1030, the device may initialize the contention window as previously selected at 1005 and proceed to selecting a CCA duration for the next transmission. Additionally or alternatively, the device may identify a collision by determining whether a detected energy level is above a threshold during a portion of signal prior to a data portion of the signal (e.g., a transmission gap in a time-domain energy signature).

If the device determines a collision has occurred at 1030, the device may increase the CW size at 1035. For instance, the device may adjust the contention window linearly, exponentially (e.g., doubling), or the like. After increasing the CW size, the device will proceed to selecting a CCA duration based on the increased CW size and proceed to performing a CCA at the selected CCA duration for a following transmission.

In some examples, if the device determines that collision has occurred at 1030, the device may increase the CW size at 1035 and modify CCA duration selection at 1010 by selecting the CW size (e.g., maximum duration of CW size). In this instance, the device may allow the other transmitter an opportunity to transmit over the channel since the other transmitter likely backed off upon detecting the transmission from the device at 1025 (e.g., by not receiving a CTS, etc.).

Figure 11:
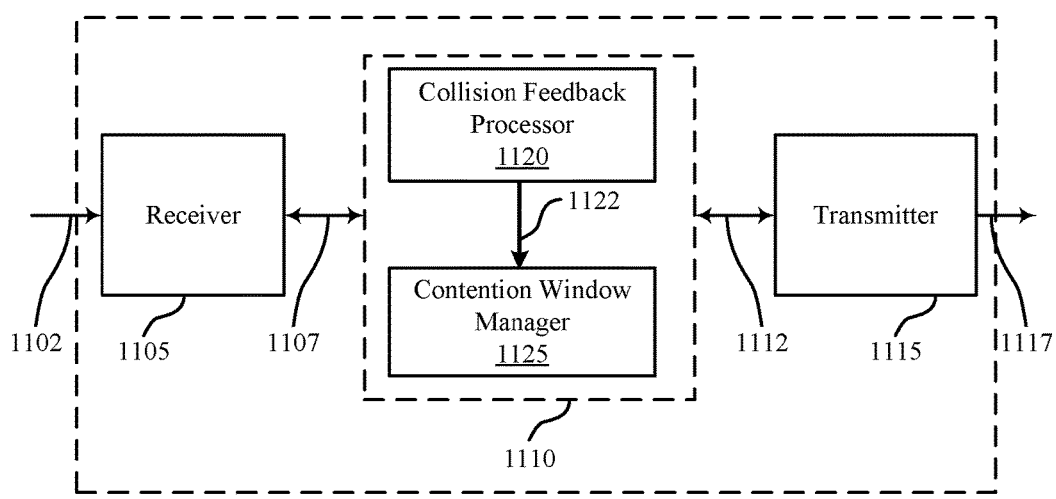
FIG. 11 shows a block diagram of a wireless device configured for collision reporting for multiple RAT co-existence in accordance with various aspects of the present disclosure.

FIG. 11 shows a block diagram of a wireless device 1100 configured for collision reporting for multiple RAT co-existence in accordance with various aspects of the present disclosure. Wireless device 1100 may be an example of aspects of a base station 105 described with reference to FIGS. 1-3B and 5. Wireless device 1100 may include a receiver 1105, a base station collision avoidance component 1110, or a transmitter 1115. The base station collision avoidance component 1110 may also include a collision feedback processor 1120 and a contention window manager 1125. Wireless device 1100 may also include a processor. Each of these components may be in communication with each other.

The receiver 1105 may receive information such as packets, user data, or control information associated with various information channels (e.g., control channels, data channels, and information related to collision reporting for multiple RAT co-existence, etc.). Information may be passed on to the base station collision avoidance component 1110, and to other components of wireless device 1100. In some examples, the receiver 1105 may receive, from the user equipment, signals 1102 in an unlicensed and/or licensed band. In some cases, a signal 1102 may include an indication of a collision between the first communication and a second communication from a second transmitter using a second radio access technology. In some examples, the signal 1102 includes a first communication that includes a code sequence having a transmission duration that is greater than or equal to a request to send (RTS) duration of an RTS signal of the second radio access technology and extends to a signal transmission boundary associated with the first radio access technology. In some examples, the signal may include an acknowledgement that a data portion of the first communication was successfully decoded by the user equipment. In some cases, the signal may include a time-domain energy signature or may include transmissions from other devices that may have collided/overlap with signals transmitted by the device. Receiver 1105 may pass a signal representation 1107 of the received signal 1102 to base station collision avoidance component 1110.

The base station collision avoidance component 1110 may send a first communication to a user equipment over a shared radio frequency spectrum band using a first radio access technology via transmitter 1115, wherein the first communication comprises a time-domain energy signature that includes a first high energy period and a subsequent first low energy period, identify that a collision occurred between the first communication and a second communication from a second transmitter using a second radio access technology based at least in part on an energy level detected during the time-domain energy signature, and increase a contention window for a subsequent communication transmitted over the shared radio frequency spectrum band based at least in part on the identifying.

In certain cases, the first communication further includes a second high energy period, following the first low energy period, that extends to a signal transmission boundary associated with the first radio access technology. In some cases, the first communication further includes a second low energy period, following the first low energy period, wherein an interval for the second low energy period is randomly selected. In some cases, the base station collision avoidance component 1110 identifies that a collision occurred prior to the data portion of the first communication between the first transmitter and a second transmitter that transmits over the shared radio frequency spectrum band using a second radio access technology based at least in part on identifying that an energy level detected during a low energy period is greater than a threshold.

The collision feedback processor 1120 may process the signal representation 1107 (e.g., received via receiver 1105), and may determine that a collision occurred between the first communication and a second communication from a second transmitter using a second radio access technology as described above with reference to FIGS. 2-6. The collision feedback processor 1120 may also determine that a collision has not occurred between the subsequent communication and a fourth communication from a second transmitter using the second radio access technology. In some cases, the collision feedback processor 1120 may receive an acknowledgement that the third communication has been successfully received by the user equipment. In some cases, the collision feedback processor 1120 may detect whether an energy level of the signal representation 1107 is higher than a threshold or whether energy is detected during transmission gaps in a time-domain energy signature. If collision feedback processor 1120 determines a collision has occurred, collision feedback processor 1120 may pass a collision indicator 1122 to contention window manager 1125. In some examples, collision feedback processor 1120 may identify and pass a channel reservation waveform 1112 to transmitter 1115 for subsequent processing and transmission.

The contention window manager 1125 may increase a contention window for a subsequent communication transmitted over the shared radio frequency spectrum band based at least in part on the received collision indicator 1122 as described with reference to FIGS. 2-6. The contention window may be increased linearly, exponentially, randomly, and the like. The contention window manager 1125 may also observe a maximum time period of the contention window for the subsequent communication. In some cases, the contention window manager may reset the contention window to a predetermined value upon not receiving an indication of a collision (e.g., not receiving a collision indicator 1112). In some cases, the contention window manager 1125 may reset the contention window to a predetermined value based at least in part on the acknowledgement being received without a second indication that a collision occurred.

The transmitter 1115 may transmit signals 1117 received from other components of wireless device 1100. In some examples, the transmitter 1115 may be collocated with the receiver 1105 in a transceiver component. The transmitter 1115 may include a single antenna, or it may include a plurality of antennas. In some examples, the transmitter 1115 may transmit a first communication to a user equipment over a shared radio frequency spectrum band using a first radio access technology. The transmitter 1115 may also transmit a subsequent communication to the user equipment over the shared radio frequency spectrum band using the first radio access technology. In some cases, the transmitter 1115 may transmit a third communication to the user equipment over the shared radio frequency spectrum band using the first radio access technology. In certain cases, the transmitter 1115 transmits the time-domain energy signature, where transmitting the time-domain signature includes transmitting a signal for high energy periods; and discontinuing transmission of the signal for a low energy periods.

Figure 12:
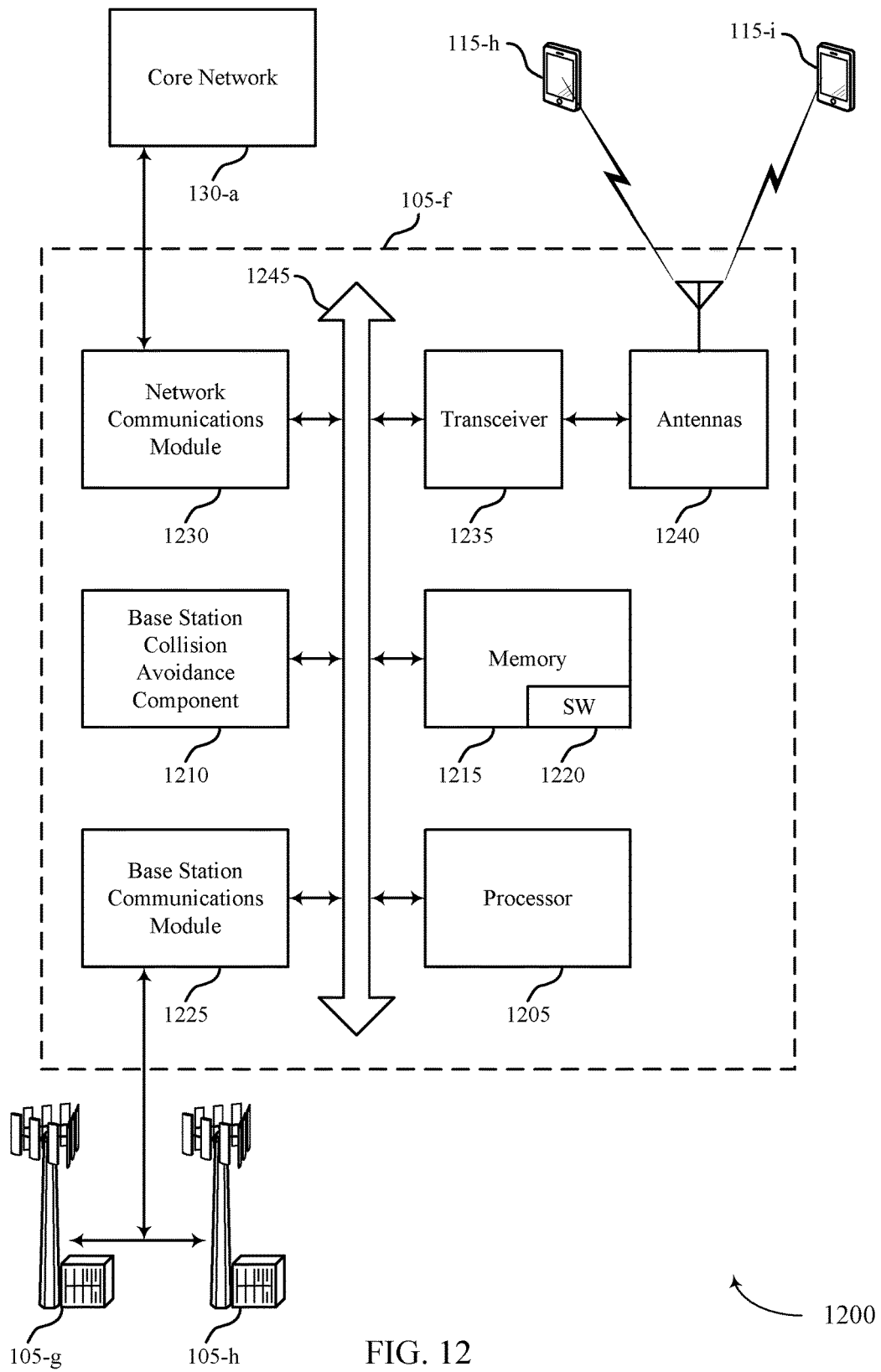
FIG. 12 shows a diagram of a system including a base station configured for collision reporting for multiple RAT co-existence in accordance with various aspects of the present disclosure.

FIG. 12 shows a diagram of a system 1200 including a base station 105-f configured for collision reporting for multiple RAT co-existence in accordance with various aspects of the present disclosure. System 1200 may include base station 105-f, which may be an example of a wireless device 1100 or a base station 105 described with reference to FIGS. 1-3B, 5, and 11. Base station 105-f may include a base station collision avoidance component 1210, which may be an example of a base station collision avoidance component 1110 described with reference to FIG. 11. Base station 105-f may also include components for bi-directional voice and data communications including components for transmitting communications and components for receiving communications. For example, base station 105-f may communicate bi-directionally with UE 115-h or UE 115-i.

In some cases, base station 105-f may have one or more wired backhaul links. Base station 105-f may have a wired backhaul link (e.g., 51 interface, etc.) to the core network 130. Base station 105-f may also communicate with other base stations 105, such as base station 105-g and base station 105-h via inter-base station backhaul links (e.g., an X2 interface). Each of the base stations 105 may communicate with UEs 115 using the same or different wireless communications technologies. In some cases, base station 105-f may communicate with other base stations, such as base stations 105-g or 105-h, utilizing base station communications component 1225. In some examples, base station communications component 1225 may provide an X2 interface within a Long Term Evolution (LTE)/LTE-A wireless communication network technology to provide communication between some of the base stations 105. In some examples, base station 105-f may communicate with other base stations through core network 130. In some cases, base station 105-f may communicate with the core network 130 through network communications component 1230.

The base station 105-f may include a processor 1205, memory 1215 (including software (SW) 920), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115, which may be multi-mode devices. The transceiver 1235 (or other components of the base station 105-f) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-f may include multiple transceivers 1235, each with one or more associated antennas 1240. The transceiver may be an example of a combined receiver 1105 and transmitter 1115 of FIG. 11.

The memory 1215 may include RAM and ROM. The memory 1215 may also store computer-readable, computer-executable software code 1220 containing instructions that are configured to, when executed, cause the processor 1205 to perform various functions described herein (e.g., collision reporting for multiple RAT co-existence, selecting coverage enhancement techniques, call processing, database management, message routing, etc.). Alternatively, the software 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications component 1225 may manage communications with other base stations 105. In some cases, a communications management component may include a controller or scheduler for controlling communications with UEs 115 in cooperation with other base stations 105. For example, the base station communications component 1225 may coordinate scheduling for transmissions to UEs 115 for various interference mitigation techniques such as beamforming or joint transmission.

The components of wireless device 700, wireless device 1100, collision detection component 710, and base station collision avoidance component 1110 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communication at a user equipment, comprising:
   receiving signaling in a shared radio frequency spectrum band, the signaling including a first communication transmitted using a first radio access technology and a second communication transmitted using a second radio access technology, wherein the first communication comprises a data portion, and wherein a collision of the first communication and the second communication occurred prior to the data portion of the first communication;

detecting a characteristic of the collision of the first communication and the second communication based at least in part on the signaling; and reporting collision feedback to a node of a wireless communications network associated with the user equipment based at least in part on the detecting.

2. The method of claim 1, wherein the first communication further comprises a channel reservation signal transmitted by a first transmitter using the first radio access technology.

3. The method of claim 2, wherein the collision occurred at the beginning of a transmission opportunity (TxOP), and includes a portion of the channel reservation signal.

4. The method of claim 2, wherein the channel reservation signal comprises one or more of a channel usage beacon signal (CUBS) or a fractional CUBS transmitted by the first transmitter.

5. The method of claim 1, wherein the second communication comprises a request to send (RTS) transmission transmitted by a second transmitter using the second radio access technology.

6. The method of claim 1, wherein detecting the characteristic of the collision comprises:

identifying a difference in an energy level of the signaling for a first portion of a transmission time period that exceeds an energy level of the first communication.

7. The method of claim 6, wherein detecting the characteristic of the collision further comprises:

identifying that a duration of the difference in the energy level corresponds to a transmission duration used for a request to send (RTS) transmission associated with the second radio access technology.

8. The method of claim 1, wherein reporting the collision feedback comprises transmitting an indication of the collision on one or more of a physical uplink shared channel (PUSCH) or a physical uplink control channel (PUCCH) to the node of the wireless communications network associated with the user equipment.

9. The method of claim 1, wherein detecting the characteristic of the collision comprises:

attempting to decode a signal transmitted by a first transmitter prior to the data portion of the first communication; and identifying that the collision occurred based at least in part on unsuccessfully decoding at least a portion of the signal.

10. The method of claim 9, wherein the signal transmitted by the first transmitter prior to the data portion of the first communication comprises a code sequence having a transmission duration that is greater than or equal to a request to send (RTS) duration of an RTS signal of the second radio access technology and extends to a signal transmission boundary associated with the first radio access technology, and wherein identifying that the collision occurred is based at least in part on unsuccessfully decoding at least a portion of the code sequence.

11. The method of claim 1, further comprising receiving a signal transmitted by a first transmitter prior to the data portion of the first communication; and wherein detecting the characteristic is based at least in part on an energy level detected during the signal.

12. The method of claim 1, wherein the first communication comprises a time-domain energy signature that includes a first high energy period and a subsequent low energy period; and wherein detecting the characteristic is based at least in part on detecting an energy level during the time-domain energy signature associated with the collision of the first communication and the second communication.

13. The method of claim 12, wherein the time-domain energy signature comprises a second high energy period, following the subsequent low energy period, that extends to a signal transmission boundary associated with the first radio access technology.

14. The method of claim 12, wherein the first communication is transmitted by a first transmitter, and wherein the time-domain energy signature further comprises a second low energy period, following the first low energy period, the method further comprising:

detecting a second characteristic of a collision that occurred prior to the data portion of the first communication between the first transmitter and a third transmitter that transmits over the shared radio frequency spectrum band using the first radio access technology based at least in part on an energy level detected during the second low energy period.

15. An apparatus for wireless communication at a user equipment, comprising:

a processor;

memory in electronic communication with the processor; and instructions stored in the memory and configured, when executed by the processor, to cause the apparatus to:

receive signaling in a shared radio frequency spectrum band, the signaling including a first communication transmitted using a first radio access technology and a second communication transmitted using a second radio access technology, wherein the first communication comprises a data portion, and wherein a collision of the first communication and the second communication occurred prior to the data portion of the first communication;

detect a characteristic of the collision of the first communication and the second communication based at least in part on the signaling; and report collision feedback to a node of a wireless communications network associated with the user equipment based at least in part on the detecting.

16. The apparatus of claim 15, wherein the first communication is transmitted by a first transmitter and the second communication is transmitted by a second transmitter, and wherein the instructions configured to cause the apparatus to receive the signaling are further configured to:

receive the first communication as a first transmission from the first transmitter over the shared radio frequency spectrum band.

17. A method for wireless communication at a base station, comprising:

transmitting a first communication to a user equipment over a shared radio frequency spectrum band using a first radio access technology, wherein the first communication comprises a data portion and a time-domain energy signature that includes a first high energy period and a subsequent first low energy period, and wherein the time-domain energy signature is transmitted prior to the data portion;

identifying that a collision of the first communication and a second communication from a second transmitter using a second radio access technology occurred based at least in part on an energy level detected during the time-domain energy signature; and adjusting a contention window for a subsequent communication transmitted over the shared radio frequency spectrum band based at least in part on the identifying.

18. The method of claim 17, further comprising:

transmitting a third communication to the user equipment over the shared radio frequency spectrum band using the first radio access technology;

receiving an acknowledgement that the third communication has been successfully received by the user equipment; and resetting the contention window to a predetermined value based at least in part on the acknowledgement being received without a second indication that a second collision occurred.

19. The method of claim 17, wherein increasing the contention window comprises linearly increasing or exponentially increasing the contention window.

20. The method of claim 17, further comprising:

observing a maximum time period of the contention window for the subsequent communication.

21. The method of claim 17, wherein the first communication comprises a code sequence having a transmission duration that is greater than or equal to a request to send (RTS) duration of an RTS signal of the second radio access technology and extends to a signal transmission boundary associated with the first radio access technology.

22. The method of claim 17, further comprising:

receiving an acknowledgement that a data portion of the first communication was successfully decoded by the user equipment.

23. The method of claim 17, wherein the first communication further comprises a second high energy period, following the first low energy period, that extends to a signal transmission boundary associated with the first radio access technology.

24. The method of claim 17, wherein the first communication further comprises a second low energy period, following the first low energy period, wherein an interval for the second low energy period is randomly selected.

25. The method of claim 17, wherein identifying that the collision occurred is based at least in part on identifying that the energy level detected during the first low energy period of the time-domain energy signature is greater than a threshold.

26. The method of claim 17, wherein the identifying that the collision occurred comprises receiving, from a UE, an indication that the collision occurred based at least in part on the energy level being detected by the UE during the time-domain energy signature.

27. The method of claim 17, wherein a time duration of the first low energy period is less than a maximum time duration for discontinuing a transmission over the shared radio frequency spectrum band that allows the transmission to be resumed without performing a listen before talk (LBT) procedure.

28. An apparatus for wireless communication at a base station, comprising:

a processor;

memory in electronic communication with the processor; and instructions stored in the memory and configured, when executed by the processor, to cause the apparatus to:

transmit a first communication to a user equipment over a shared radio frequency spectrum band using a first radio access technology, wherein the first communication comprises a data portion and a time-domain energy signature that includes a first high energy period and a subsequent first low energy period, and wherein the time-domain energy signature is transmitted prior to the data portion;

identify, by the base station, that a collision of the first communication and a second communication from a second transmitter using a second radio access technology occurred based at least in part on an energy level detected during the time-domain energy signature; and adjust a contention window for a subsequent communication transmitted over the shared radio frequency spectrum band based at least in part on the identifying.

* * * * *